(12) United States Patent
Hellmers et al.

(10) Patent No.: US 11,980,319 B2
(45) Date of Patent: May 14, 2024

(54) COFFEE PUCK REMOVAL DEVICE

(71) Applicant: BREVILLE PTY LIMITED, Alexandria (AU)

(72) Inventors: Duncan Bruce Hellmers, Alexandria (AU); Stephen John Mcclean, Alexandria (AU); Pierce Barnard, Alexandria (AU); Caroline Valentina Vasta, Alexandria (AU); Andrew Robert Morgan, Alexandria (AU); Andrew Domenic Gregorace, Alexandria (AU); Robert Grassia, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 695 days.

(21) Appl. No.: 17/256,220

(22) PCT Filed: Jun. 27, 2019

(86) PCT No.: PCT/AU2019/050672
§ 371 (c)(1),
(2) Date: Dec. 27, 2020

(87) PCT Pub. No.: WO2020/000045
PCT Pub. Date: Jan. 2, 2020

(65) Prior Publication Data
US 2021/0267411 A1    Sep. 2, 2021

(30) Foreign Application Priority Data

Jun. 27, 2018 (AU) ................................ 2018902306
Jun. 27, 2018 (AU) ................................ 2018902307

(51) Int. Cl.
*A47J 31/60* (2006.01)
*A47J 31/06* (2006.01)
(Continued)

(52) U.S. Cl.
CPC ........... *A47J 31/60* (2013.01); *A47J 31/0663* (2013.01); *B08B 5/04* (2013.01); *A47J 31/44* (2013.01)

(58) Field of Classification Search
CPC .............. A47J 31/60; A47J 31/44; A47J 31/00
(Continued)

(56) References Cited

U.S. PATENT DOCUMENTS

2011/0030562 A1* 2/2011 Ambrosini .......... A47J 31/0663
                                                    99/289 R
2018/0042423 A1* 2/2018 Ceotto ................ A47J 31/0657
(Continued)

FOREIGN PATENT DOCUMENTS

CN          203987656 U      12/2014
CN          105078262 B       5/2018
(Continued)

OTHER PUBLICATIONS

International Search Report for Application No. PCT/AU2019/050672, dated Sep. 11, 2019.
European Search Report dated Mar. 29, 2022 for 19825017.7.

*Primary Examiner* — Reginald Alexander
(74) *Attorney, Agent, or Firm* — Quarles & Brady LLP

(57) ABSTRACT

A coffee puck removal device (10) to remove a coffee puck (24) from a portafilter (20) is disclosed herein. The coffee puck removal device (10) has an open compartment (22) containing the coffee puck (24), the coffee puck (24) having an exposed major outer face (26) and a major inner face (28) when the coffee puck (24) is located in the open compartment (22). The device (10) includes: a body (12) having a rim (14) surrounding an aperture (16), with the rim (14) being configured to engage the portafilter (20), with the open compartment (22) facing the body (12) to inhibit air passing between the portafilter (20) and the rim (14); and a vacuum source (30) to remove air from the aperture (16) so that air (Continued)

pressure applied to the major inner face (28) is greater than air pressure applied to the exposed major outer face (26) so that the coffee puck (24) is removed from the portafilter (20).

20 Claims, 32 Drawing Sheets

(51) Int. Cl.
 *B08B 5/04* (2006.01)
 *A47J 31/44* (2006.01)
(58) Field of Classification Search
 USPC .......................................................... 99/472
 See application file for complete search history.

(56) References Cited

U.S. PATENT DOCUMENTS

| | | | | |
|---|---|---|---|---|
| 2018/0161823 | A1* | 6/2018 | Patton | A47J 31/0663 |
| 2019/0075964 | A1* | 3/2019 | Della Pietra | A47J 31/60 |

FOREIGN PATENT DOCUMENTS

| | | |
|---|---|---|
| EP | 3158901 A1 | 4/2017 |
| ES | 1011100 U | 3/1990 |
| ES | 1068956 U | 1/2009 |
| ES | 2383397 B1 | 4/2013 |
| FR | 2716386 A1 | 8/1995 |

* cited by examiner

COFFEE PUCK REMOVAL DEVICE

FIELD

The present relates to the cleaning of espresso machine portafilters, and more particularly a device for removing a coffee puck from an espresso machine portafilter.

BACKGROUND

In a conventional espresso machine, a portafilter is used to carry coffee grounds during a coffee brewing process. After the coffee brewing process is complete, the used coffee grounds are removed from the portafilter so that fresh coffee grounds may be inserted for the next brew. The used coffee grounds are typically dense and compacted in the portafilter in the form of a coffee puck. Removal of the coffee puck from the portafilter typically requires tapping or striking the portafilter multiple times against a 'knock box', causing the coffee puck to be dislodged from the portafilter and to fall into a container or bag for disposal.

A disadvantage of conventional methods to remove a coffee puck from a portafilter is the prospect of creating mess from the dislodged coffee puck. For example, if the portafilter is struck against the knock box at an unsuitable angle for dislodging the coffee puck, the coffee puck fragments may spray on to the surfaces or walls around the knock box, thus requiring additional cleaning up. If the coffee puck has been left in the portafilter for an extended period of time, the coffee puck typically dries out and hardens, which then requires increased and repeated force to strike the portafilter against the knock box. The striking action also creates loud noises and/or damage to the portafilter, which may be undesirable for the user.

OBJECT OF THE INVENTION

It is the object of the present invention to overcome or substantially ameliorate at least one of the above disadvantages.

SUMMARY OF THE INVENTION

There is disclosed herein a coffee puck removal device to remove a coffee puck from a portafilter having an open compartment containing the coffee puck, the coffee puck having an exposed major outer face and a major inner face when the coffee puck is located in the open compartment, the device including:
  a body having a rim surrounding an aperture, with the rim being configured to engage the portafilter, with the open compartment facing the body to inhibit air passing between the portafilter and the rim; and
  a vacuum source to remove air from the aperture so that air pressure applied to the major inner face is greater than air pressure applied to the exposed major outer face so that the coffee puck is removed from the portafilter.

Preferably, the aperture is at least the size of the coffee puck to allow the coffee puck to pass therethrough.

Preferably, the rim includes a resilient material at least partly surrounding the aperture to aid in sealingly connecting the rim and the portafilter.

Preferably, the vacuum source is a vacuum pump operable to remove air from the aperture.

Preferably, the body includes an interior chamber, and the vacuum source is connected to the interior chamber to remove air from the interior chamber.

Preferably, the coffee puck removal device further includes a sensor to detect the engagement of the rim with the portafilter and enable operation of the air pump to remove air from the aperture.

Preferably, the sensor detects removal of the portafilter from the rim and disables operation of the air pump.

In one form, the sensor is a contact switch. In another form, the sensor is a limit switch. In yet another form, the sensor is a proximity switch.

There is also disclosed herein an espresso machine including the coffee puck removal device as described above.

Preferably, the espresso machine further includes a coffee outlet and a platform located below the coffee outlet, and the coffee puck removal device is integrated into the platform of the espresso machine.

There is disclosed herein a coffee puck removal device to remove a coffee puck from a portafilter having an open compartment containing the coffee puck, the coffee puck having an exposed major outer face and a major inner face when the coffee puck is located in the open compartment, the device including:
  a body having a rim surrounding an aperture, with the rim being configured to engage the portafilter, with the open compartment facing the body to inhibit air passing between the portafilter and the rim; and
  a mechanism to remove air from the aperture so that air pressure applied to the major inner face is greater than air pressure applied to the exposed major outer face so that the coffee puck is removed from the portafilter.

Preferably, the mechanism is a bellows that is compressed to remove air from the aperture.

There is also disclosed herein an espresso machine including the coffee puck removal device as described above.

There is also disclosed herein a coffee puck removal device to remove a coffee puck from a portafilter having an open compartment containing the coffee puck, the device including:
  a body defining an open region for receiving the portafilter; and
  a scraper mounted within the open region of the body, the scraper being adapted to be rotatably driven to dislodge the coffee puck from the open compartment of the portafilter;
  a motor mounted to the body and adapted to rotatably drive the scraper; and
  a current measuring device operatively associated with the motor and adapted to detect a current load on the motor, wherein operation of the motor is disabled when a current load detected by the current measuring device is below a predetermined threshold.

There is also disclosed herein a method of removing a coffee puck from a portafilter having an open compartment containing the coffee puck, the method including the steps of:
  providing power to a coffee puck removal device to enable operation of a motor, wherein the motor rotatably drives a scraper to dislodge the coffee puck from the open compartment of the portafilter;
  detecting a current load on the motor by a current measuring device operatively associated with the motor; and
  disabling operation of the motor when the current load on the motor detected by the current measuring device is below a predetermined threshold.

There is also disclosed herein a method of removing a coffee puck from a portafilter having an open compartment containing the coffee puck, the method including the steps of:

providing power to a coffee puck removal device to enable operation of a motor, wherein the motor drives a vacuum pump to dislodge the coffee puck from the open compartment of the portafilter;

detecting pressure within an interior chamber of the coffee puck removal device by a pressure sensor; and disabling operation of the motor when the pressure detected by the pressure sensor reaches a predetermined threshold, indicating that the coffee puck has been dislodged.

There is also disclosed herein a method of removing a coffee puck from a portafilter having an open compartment containing the coffee puck, the method including the steps of:

providing power to a coffee puck removal device to enable operation of a motor, wherein the motor drives a vacuum pump to dislodge the coffee puck from the open compartment of the portafilter;

detecting a current load on the motor by a current measuring device operatively associated with the motor; and disabling operation of the motor when the current load on the motor detected by the current measuring device is below a predetermined threshold.

BRIEF DESCRIPTION OF THE DRAWINGS

Preferred forms of the present invention will now be described by way of example only, with reference to the accompanying drawings, in which.

DESCRIPTION OF THE EMBODIMENTS

Figure 1:
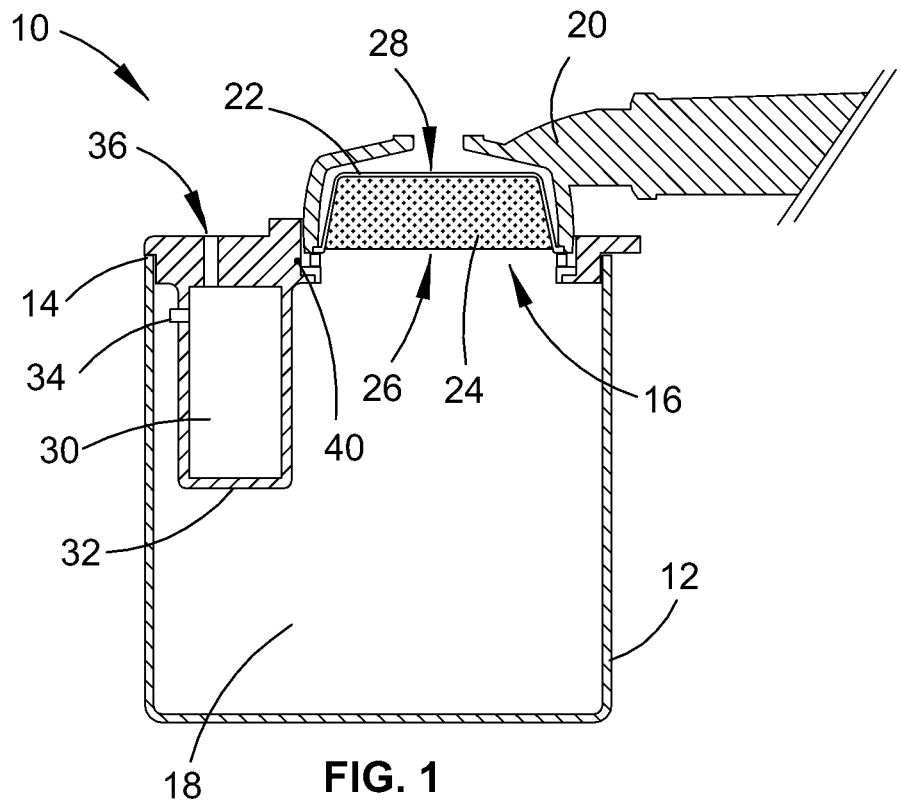
FIG. 1 is a schematic sectioned side elevation view of a first embodiment of a coffee puck removal device.
Figure 2:
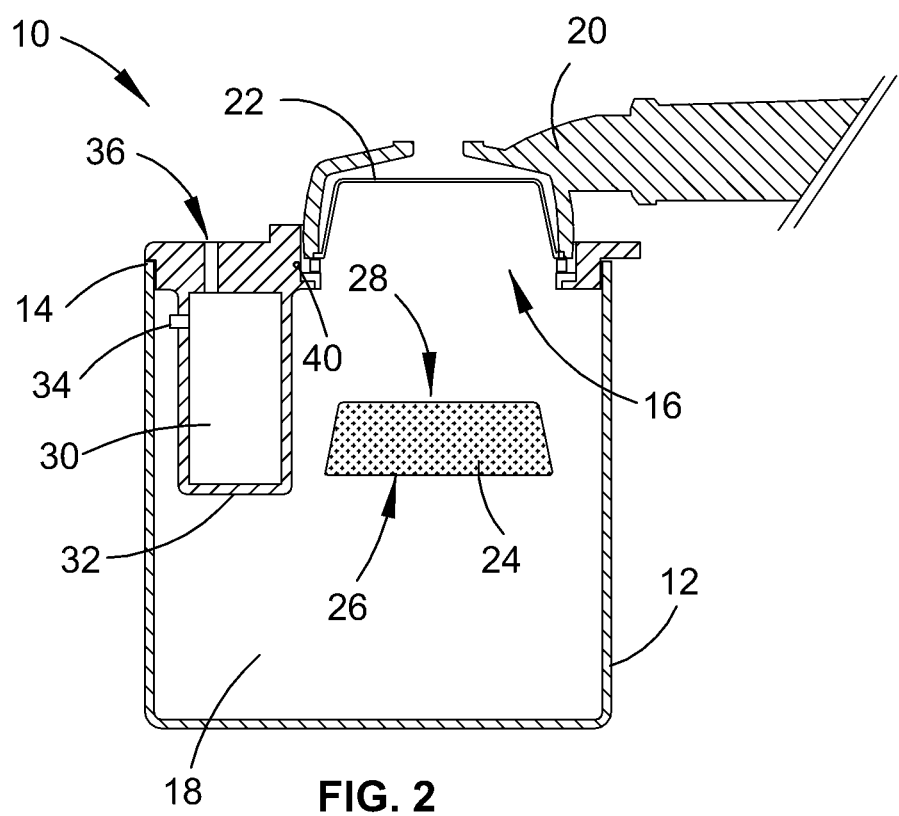
FIG. 2 is a further schematic sectioned side elevation view of the coffee puck removal device of FIG. 1.
Figure 3:
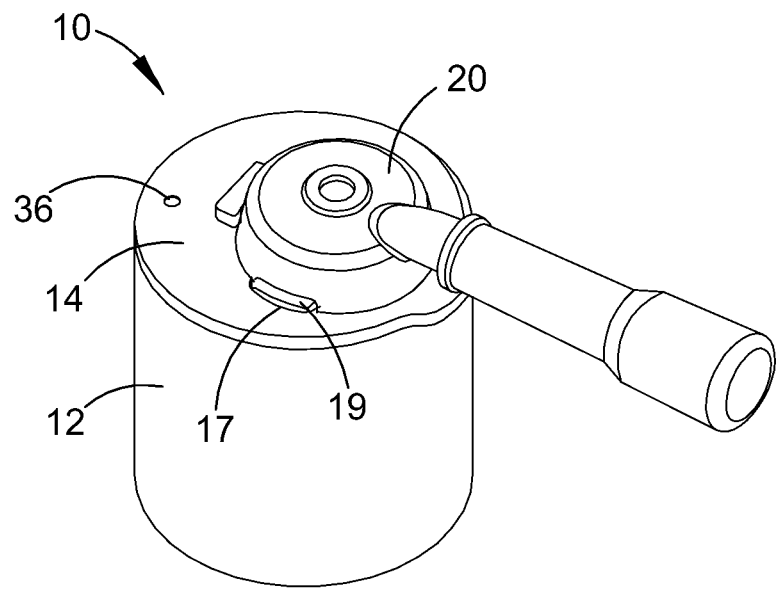
FIG. 3 is a schematic isometric view of the coffee puck removal device of FIG. 1.
Figure 4:
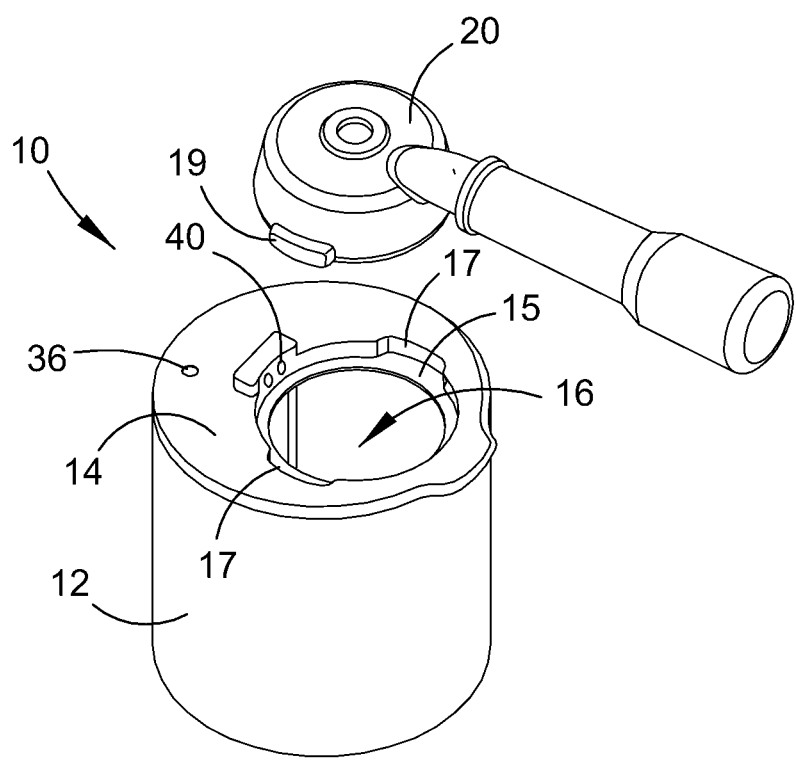
FIG. 4 is a further schematic isometric view of the coffee puck removal device of FIG. 1.
Figure 5:
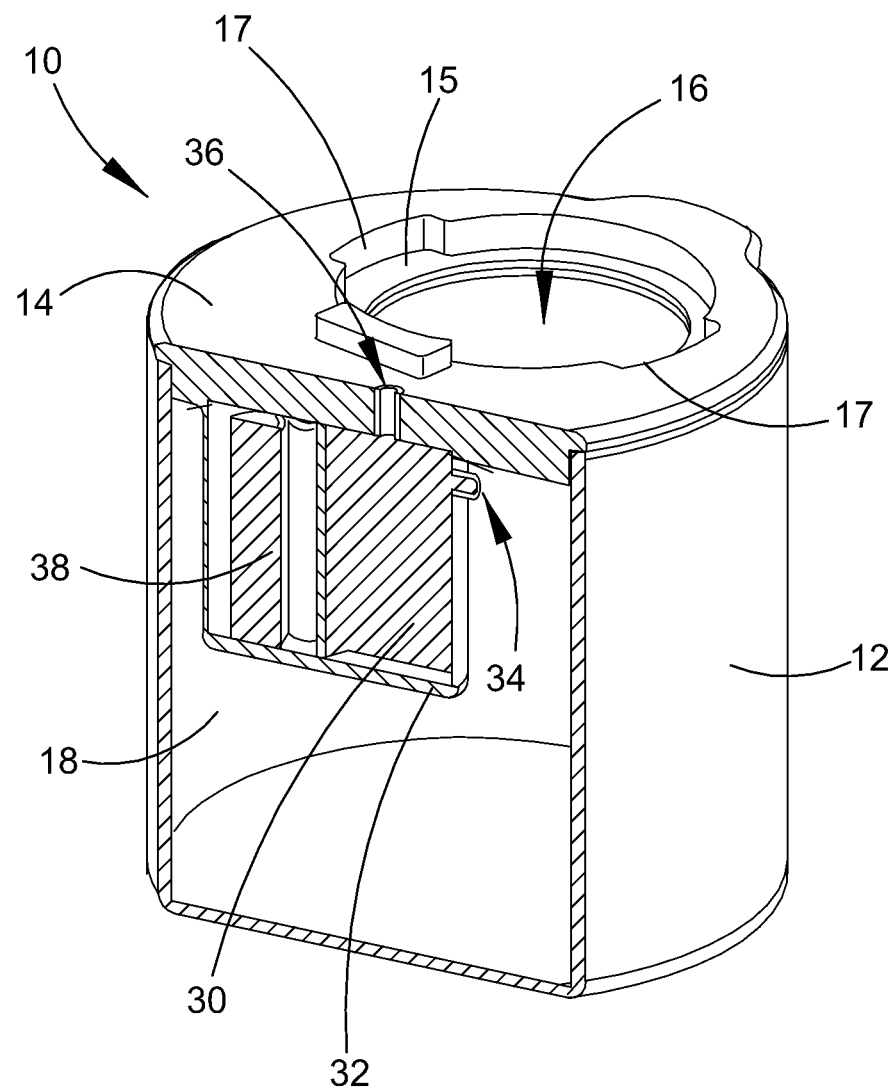
FIG. 5 is a schematic sectioned isometric view of the coffee puck removal device of FIG. 1.
Figure 6:
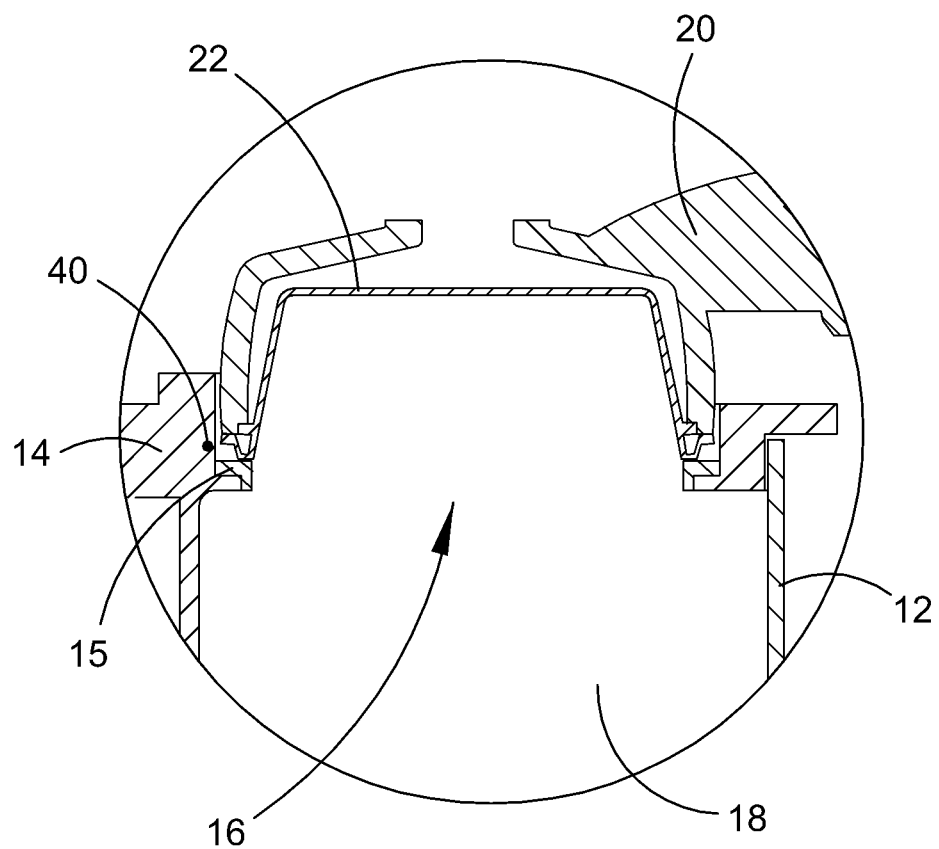
FIG. 6 is an enlarged schematic sectioned side view of the coffee puck removal device of FIG. 1.
Figure 7:
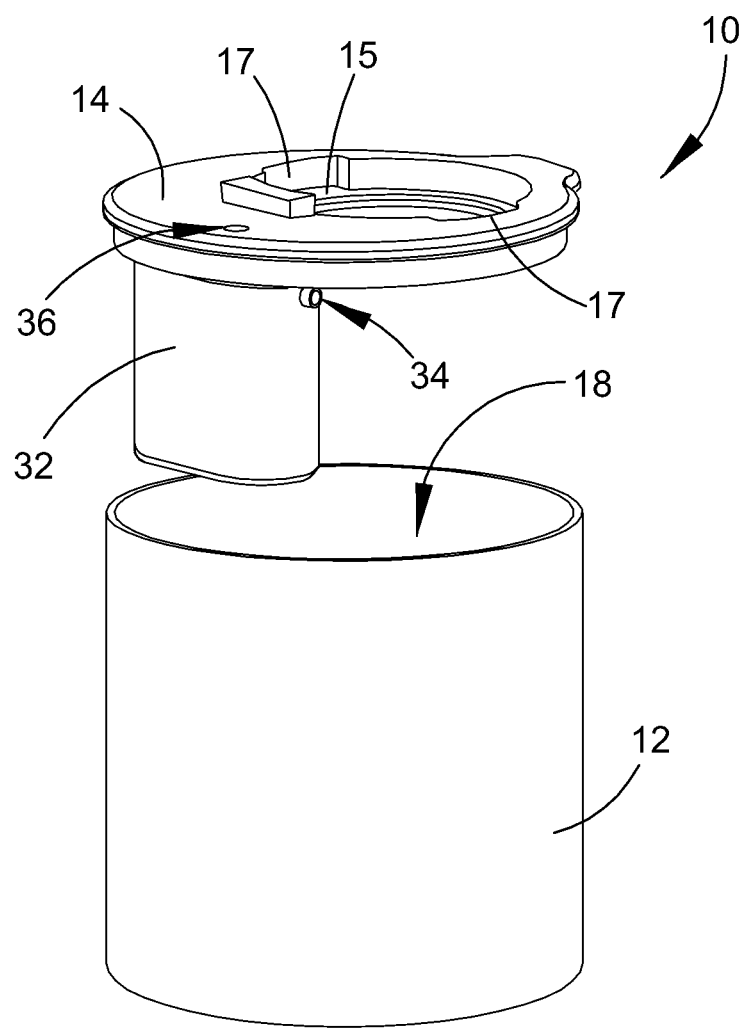
FIG. 7 is a further schematic isometric view of the coffee puck removal device of FIG. 1.

In FIGS. 1 to 7 of the accompanying drawings there is schematically depicted a coffee puck removal device 10. The coffee puck removal device 10 includes a body 12 having a rim 14 surrounding an aperture 16. The body 12 includes an interior chamber 18 in communication with the aperture 16. The rim 14 is configured to engage a portafilter 20 of an espresso machine such that the portafilter 20 covers the aperture 16 to inhibit air passing between the portafilter 20 and the rim 14. In a preferred form, the rim 14 includes a resilient material 15, such as an elastomer, at least partially surrounding the aperture 16 to aid in sealingly connecting the rim 14 and the portafilter 20. The rim 14 further includes a pair of opposing slots 17 to receive a corresponding pair of opposing tabs 19 on the portafilter 20 so as to correctly position the portafilter 20 in the aperture 16.

The portafilter 20 includes an open compartment 22 to hold a coffee puck 24. It will be understood that the coffee puck 24 is formed from compressed used coffee grounds following a coffee brewing process of the espresso machine, and the coffee puck 24 typically takes the shape of the compartment 22 of the portafilter 20. The coffee puck 24 has an exposed major outer face 26 and a major inner face 28 when the coffee puck 24 is located in the portafilter 20.

Figure 8:
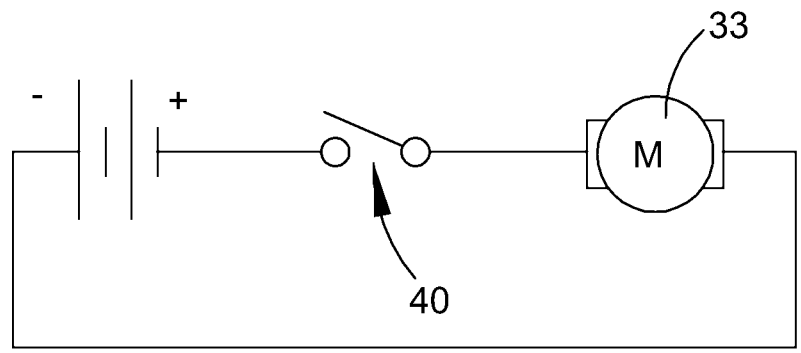
FIG. 8 is a schematic view of a circuit diagram relating to an operation of the coffee puck removal device of FIG. 1.
Figure 9:
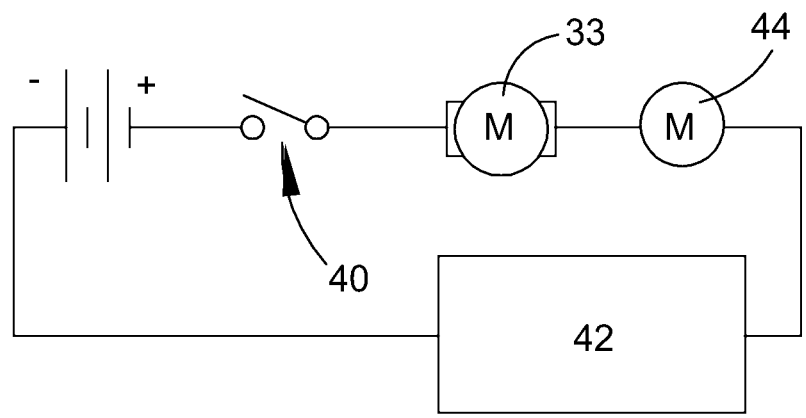
FIG. 9 is a schematic view of a further circuit diagram relating to an operation of the coffee puck removal device of FIG. 1.
Figure 10:
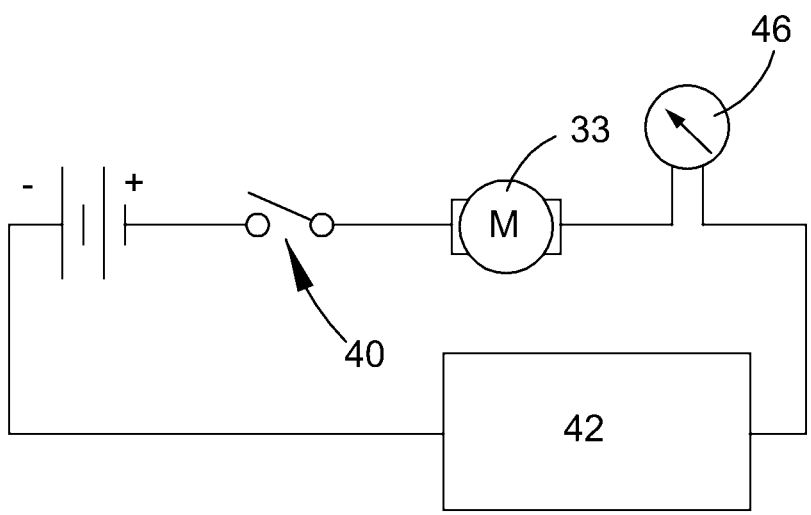
FIG. 10 is a schematic view of a further circuit diagram relating to an operation of the coffee puck removal device of FIG. 1.

The coffee puck removal device 10 further includes a vacuum source 30 connected to the interior chamber 18 of the body 12. The vacuum source 30 is operable to remove air from the aperture 16 and the interior chamber 18. In a preferred form, the vacuum source 30 is a vacuum pump housed in a compartment 32. In the depicted embodiment, the compartment 32 is integrally formed with the rim 14. It will be appreciated that the compartment 32 may alternatively be separately formed and mountable to the rim 14 or the body 12. The vacuum pump is operatively associated with a motor 33 (as best shown in FIGS. 8 to 10) and is operable to remove air from the aperture 16 and the interior chamber 18.

In the depicted embodiment, the air being removed travels into an inlet 34 located in the compartment 32 and is pumped into the atmosphere through an outlet 36 located in the rim 14. It will be appreciated that in other embodiments (not shown), the outlet 36 may alternatively be located in the body 12. The vacuum pump is operable by way of a power source, such as batteries 38, housed in the compartment 32.

It will be appreciated that the aperture 16 is at least the size of the coffee puck 24 to allow the coffee puck 24 to pass therethrough and to fall into the interior chamber 18.

The coffee puck removal device 10 further includes a sensor 40 to detect the engagement of the rim 14 with the portafilter 20. The sensor 40 is operatively associated with a microprocessor 42 (as best shown in FIGS. 8 to 10) that receives a signal from the sensor 40 to enable operation of the vacuum pump to remove air from the aperture 16 and the interior chamber 18. The sensor 40 also detects the removal or disengagement of the portafilter 20 from the rim 14 and sends a signal to the microprocessor to disable operation of the vacuum pump. The sensor 40 may be in the form of a contact switch or a limit switch to detect when the portafilter 20 is in physical contact with the rim 14. The sensor 40 may alternatively be in the form of a proximity switch to detect when the portafilter 20 is within a close distance to the rim 14.

The operation of the coffee puck removal device 10 will now be described.

The coffee puck 24 is formed in the compartment 22 of the portafilter 20 following the coffee brewing process. The portafilter 20 containing the coffee puck 24 is placed on the coffee puck removal device 10 such that the rim 14 engages the portafilter 20, thereby covering the aperture 16 and inhibiting air passing between the portafilter 20 and the rim 14. The sensor 40 detects the engagement of the rim 14 and the portafilter 20, and sends a signal to the microprocessor 42 to enable operation of the vacuum source 30 (i.e. the vacuum pump). The vacuum source 30 removes air from the aperture 16 and the interior chamber 18 so that air pressure applied to the major inner face 28 is greater than air pressure applied to the exposed major outer face 26, which then causes the removal of the coffee puck 24 from the portafilter 20. It would therefore be appreciated by a person skilled in the art that vacuum pressure is effectively acting upon the major inner face 28 and the exposed major outer face 26 of the coffee puck 24, which results in structural compression of the coffee puck 24, with the weakest point being the exposed major outer face 26, causing the coffee puck 24 to dislodge from the portafilter 20. Following the removal of the coffee puck 24 from the portafilter 20, the portafilter 20 is removed from the rim 14. The sensor 40 detects the removal of the portafilter from the rim 14 and sends a signal to the microprocessor to disable the operation of the vacuum source 30.

In FIGS. 8 to 10 there is schematically depicted circuit diagrams for the operation of the sensor 40 and microprocessor 42.

FIG. 8 shows a circuit diagram for the operation of the sensor 40 and the motor 33 under a manual shut-off mode. In this manual shut-off mode, the sensor 40 detects the engagement of the rim 14 with the portafilter 20 and enables operation of the motor 33 to operate the vacuum pump. The operation of the motor 33 and the vacuum pump is then disabled when the sensor 40 no longer detects the presence of the portafilter 20 (i.e. when the portafilter 20 is removed from the rim 14).

FIG. 9 shows a circuit diagram for the operation of the sensor 40 and the motor 33 under a first automatic shut-off mode. In this first automatic shut-off mode, and similar to the manual shut-off mode described above, the sensor 40 detects the engagement of the rim 14 with the portafilter 20 and enables operation of the motor 33 to operate the vacuum pump. However, in this first automatic shut-off mode, a current measuring device 44 measures the current draw or load on the motor 33 when the motor 33 is operated. When the current measuring device 44 detects a drop in the current draw or load on the motor 33, the current measuring device 44 sends a signal to the microprocessor 42 to indicate that the coffee puck 24 has been removed from the portafilter 20 and disables the operation of the motor 33 and the vacuum pump.

FIG. 10 shows a circuit diagram for the operation of the sensor 40 and the motor 33 under a second automatic shut-off mode, which is generally similar to the first automatic shut-off mode described above. However, in this second automatic shut-off mode, a pressure sensor 46 monitors and measures the air pressure within the interior chamber 18 during operation of the motor 33. When the portafilter 20 is engaged with the rim 14, and prior to the operation of the vacuum pump to remove the coffee puck 24 from the portafilter 20, the microprocessor 42 enables operation of the pressure sensor 46 to detect and take a quick reading of the pressure in the interior chamber 18. It will be understood that at this point, the pressure in the interior chamber 18 is at atmospheric pressure (i.e. a "baseline" pressure). The pressure reading is then tared at this atmospheric (baseline) pressure, which becomes the predetermined threshold. Once the pressure reading is tared, the microprocessor 42 sends a signal to enable the operation of the motor 33 and the associated vacuum pump. This results in a slight pressure drop (i.e. a negative or vacuum pressure) within the interior chamber 18. When the coffee puck 24 is removed from the portafilter 20, the pressure sensor 46 detects that the air pressure has returned to the tared pressure reading, meaning that the vacuum pressure in the interior chamber 18 is lost, and the pressure sensor 46 and sends a signal to the microprocessor 42 to disable the operation of the motor 33 and the vacuum pump.

Figure 10A:
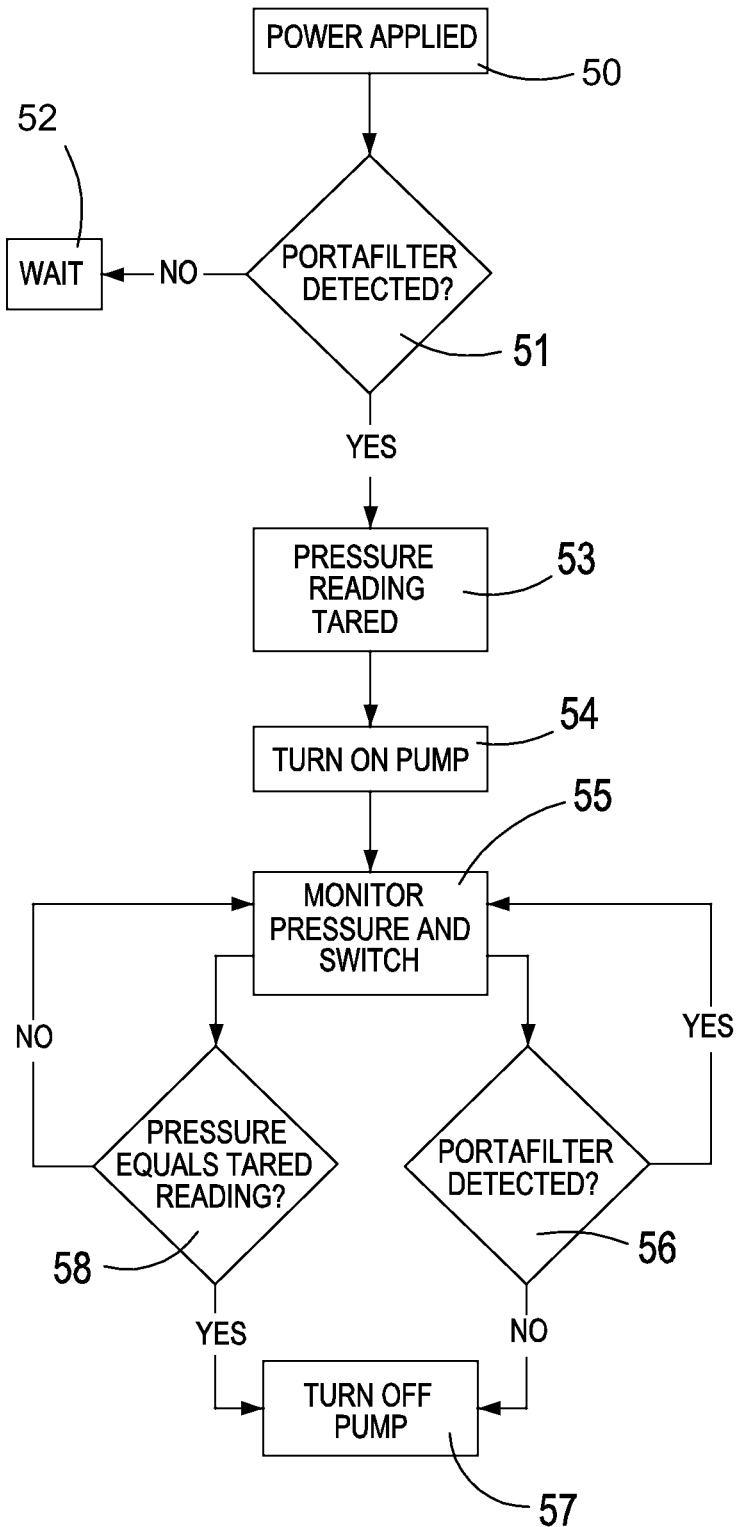
FIG. 10A is a schematic view of an operation logic of the coffee puck removal device of FIG. 1

In FIG. 10A, there is schematically depicted an operation logic incorporating the second automatic shut-off mode described above. At step 50, power is applied to the coffee puck removal device 10, e.g. by a user manually activating a power switch associated with the coffee puck removal device 10. At step 51, the sensor 40 detects the engagement of the rim 14 with the portafilter 20. If the portafilter 20 containing the coffee puck 24 is not engaged with the rim 14, then operation of the motor 33 is not enabled at step 52. Once the portafilter 20 containing the coffee puck 24 is engaged with the rim 14, and prior to the operation of the vacuum pump, the microprocessor 42 enables operation of the pressure sensor 46 to detect and take a quick reading of the pressure in the interior chamber 18. As discussed above, the pressure in the interior chamber 18 at this point is understood to be at the atmospheric (baseline) pressure. The pressure reading is then tared at this atmospheric (baseline) pressure, i.e. the predetermined threshold, at step 53. Once the pressure reading is tared, the microprocessor sends a signal to enable the operation of the motor 33 and the associated air pump at step 54.

At step 55, the pressure sensor 46 monitors and measures the pressure within the interior chamber 18. The operation of the motor may then be disabled in one of two ways, i.e. at step 56 or step 58.

After some time has elapsed at step 56, if the sensor 40 detect that the portafilter 20 is still engaged with the rim 14, the microprocessor 42 sends a signal to the pressure sensor 46 to allow the pressure sensor 46 to continue monitoring the pressure within the interior chamber 18. If the sensor 40 detects that the portafilter 20 (with or without the coffee puck 24) is disengaged from the rim 14, the microprocessor 42 disables the operation of the motor 33 and the associated vacuum pump at step 57.

At step 58, if the pressure sensor 46 detects that the pressure in the interior chamber 18 is not equal to the tared pressure reading (i.e. the pressure in the interior chamber 18 is below the predetermined threshold, meaning there is a negative or vacuum pressure), this indicates that the coffee puck 24 has not been dislodged yet, and the pressure sensor 46 continues to monitor the pressure within the interior chamber 18 at step 55. If the pressure sensor 46 detects that the pressure in the interior chamber 18 is equal to the tared pressure reading (i.e. the pressure in the interior chamber 18 is at the predetermined threshold, meaning the negative or vacuum pressure has been lost), the pressure sensor 46 sends a signal to the microprocessor 42 to indicate that the coffee puck 24 has been dislodged from the portafilter 20 and disables the operation of the motor 33 and the associated vacuum pump at step 57.

Figure 10B:
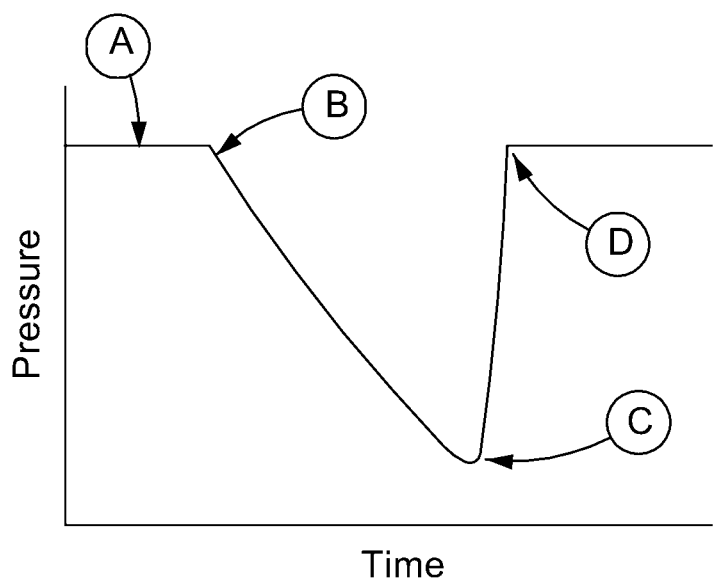
FIG. 10B is a schematic view of a chart showing pressure variations in an interior chamber of the coffee puck removal device over time.

FIG. 10B shows the pressure variations in the interior chamber 18 over time. It will be understood that the pressure at A is indicative of the atmospheric (baseline) pressure detected in the interior chamber prior to the operation of the vacuum pump. This is the point at which the pressure reading is tared. At point B, the vacuum pump is enabled and the pressure starts to drop in the interior chamber 18, resulting in a negative or vacuum pressure. At point C, the coffee puck 24 is dislodged. At this point, the vacuum pressure in the interior chamber 18 is lost. At point D, the pressure in the interior chamber 18 is returned to the atmospheric (baseline) pressure, thereby being equalised with the tared pressure, and the operation of the vacuum pump is disabled.

It will be appreciated that the vacuum pump is operable to drop the pressure in the interior chamber 18 in a range of between about −1 kPa to −80 kPa. It is envisaged that any negative pressure within this range will be sufficient to dislodge the coffee puck 24. The exact negative pressure at which the coffee puck 24 is dislodged depends on the level of compaction of the coffee puck 24 in the portafilter 20, the moisture content of the coffee puck 24, the amount of draft on the walls of the portafilter 20, and the amount of time that the coffee puck 24 has been in the portafilter. In some circumstances whereby the coffee puck 24 is almost ready to be dislodged without any assistance, the required negative pressure may be even more gentle than −1 kPa.

Figure 11:
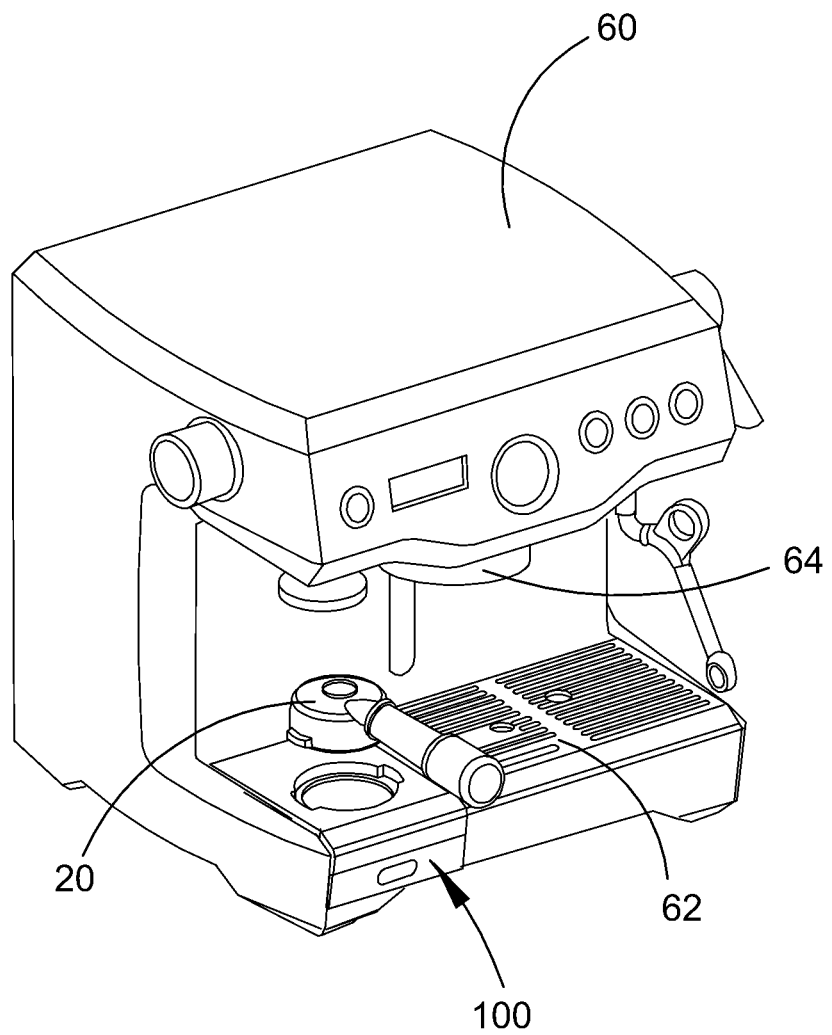
FIGS. 11 and 12 are schematic isometric views of a second embodiment of a coffee puck removal device incorporated into an espresso machine.
Figure 12:
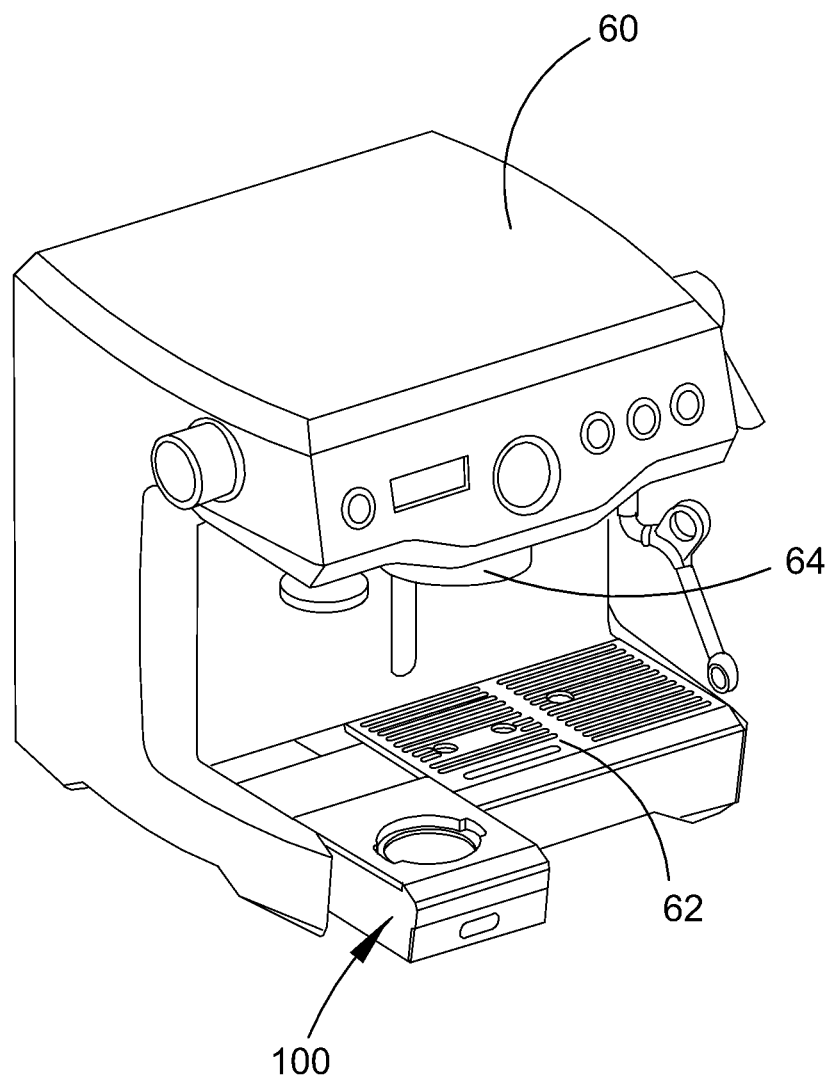
Figure 13:
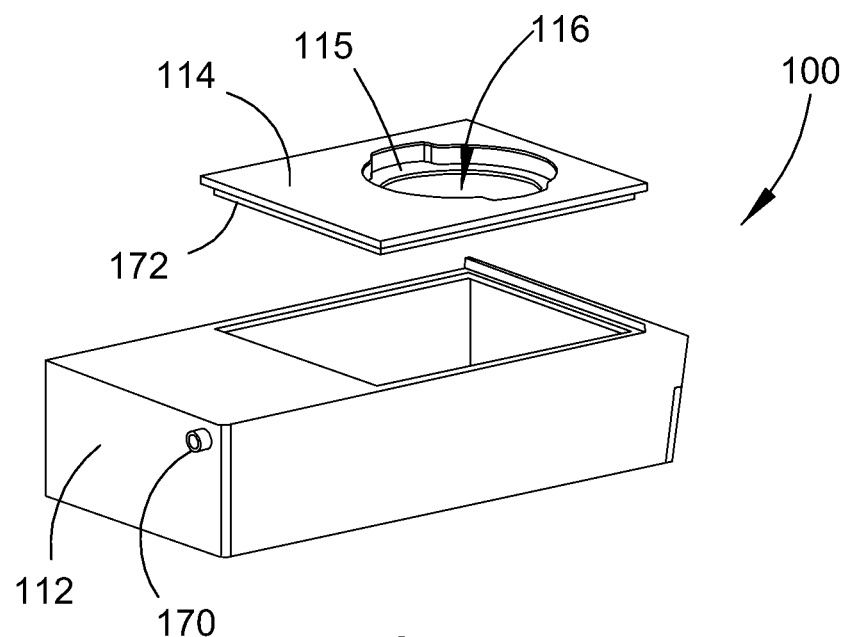
FIGS. 13 to 17 are schematic isometric views of the coffee puck removal device of FIG. 11 isolated from the espresso machine.
Figure 14:
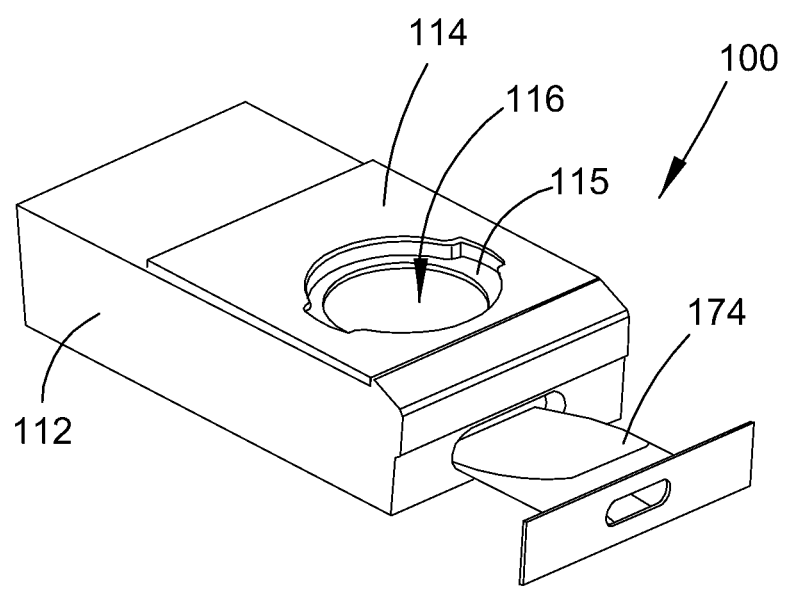
Figure 15:
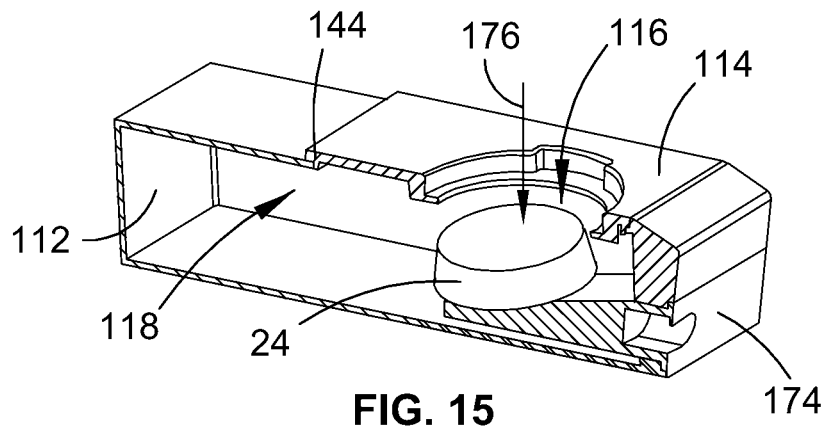
Figure 16:
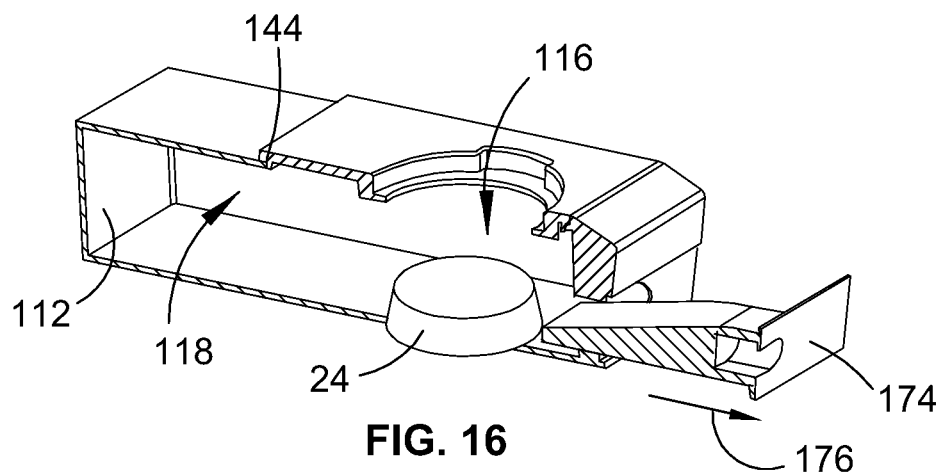
Figure 17:
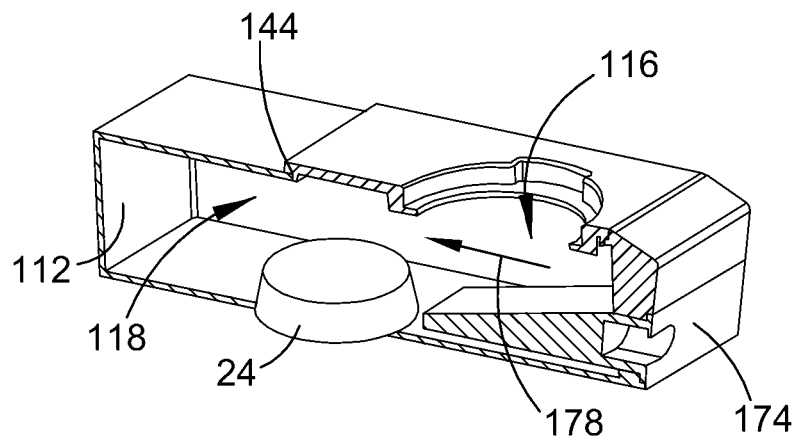
Figure 18:
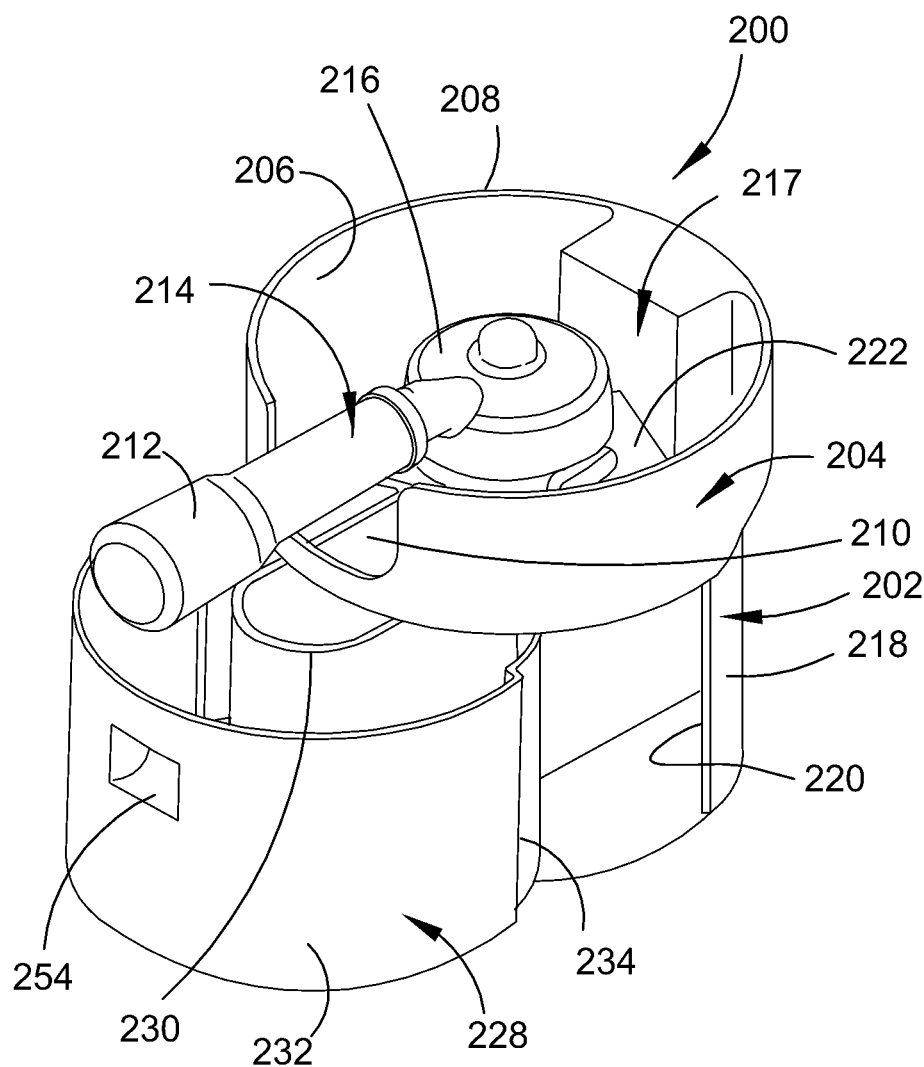
FIG. 18 is a schematic isometric view of a further embodiment of a coffee puck removal device.

In FIGS. 11 and 12 there is schematically depicted an espresso machine 60 which incorporates an embodiment of a coffee puck removal device 100. The coffee puck removal device 100 operates in generally the same manner as the device 10 described above, with like reference numerals being used to indicate like features. However, in this embodiment, the coffee puck removal device 100 is integrated into a platform 62 of the espresso machine 60. The platform 62 is located below a coffee outlet 64 of the espresso machine 60. The coffee outlet 64 typically engages the portafilter 20 during the coffee brewing process of the espresso machine 60. The coffee puck removal device 100 is slidably engaged with the platform 62 and is removable for ease of cleaning and disposal of the captured coffee pucks.

In FIGS. 13 to 17 there is schematically depicted the coffee puck removal device 100 isolated from the espresso machine 60. The coffee puck removal device 100 includes a port 170 to connect to a vacuum source (not shown) located within the espresso machine 60. The rim 114 of the coffee puck removal device 100 is in the form of a removable lid with an integrated gasket 172 to aid in sealingly connecting to the body 112. The coffee puck removal device 100 also includes a sweeper 174 incorporated into the body 112 of the device 100 and located below the aperture 116. The sweeper 174 slidably engages the body 112 of the device 100. Once the coffee puck 24 is removed from the portafilter 20, it travels through the aperture 116 in the direction 176, and lands on the sweeper 174. The sweeper 174 is then moved away from the captured coffee puck 24 in the direction 176, which causes the coffee puck 24 to settle on the floor of the body 112. The sweeper 174 is then moved back towards the captured coffee puck 24 in the direction 178, which causes the coffee puck 24 to be pushed to an empty area in the interior chamber 118 of the body 112, thereby making room for the next coffee puck 24.

In FIGS. 18 to 23 of the accompanying drawings, there is schematically depicted a further embodiment of a coffee puck removal device 200. The coffee puck removal device 200 includes a body defined by a lower compartment 202 and an upper compartment 204. The upper compartment 204 is defined by a circumferential outer wall 206. The circumferential outer wall 206 has a generally circular shape and includes an upper rim 208. The circumferential outer wall 206 includes a recess 210 for receiving a handle 212 of a portafilter 214 of an espresso machine. It will be understood that the portafilter 214 includes a portafilter head 216 having an open compartment which holds compressed used coffee grounds following a coffee brewing process of the espresso machine. For the purpose of this specification, it will be understood that the compressed used coffee grounds typically forms a coffee puck that takes the shape of the open compartment of the portafilter 214. The circumferential outer wall 206 defines an open region for receiving the portafilter head 216. The upper compartment 204 also includes an enclosure 217 for housing various electronic components of the coffee puck removal device 200, such as one or more processors, motor controllers, and sensors.

Figure 20:
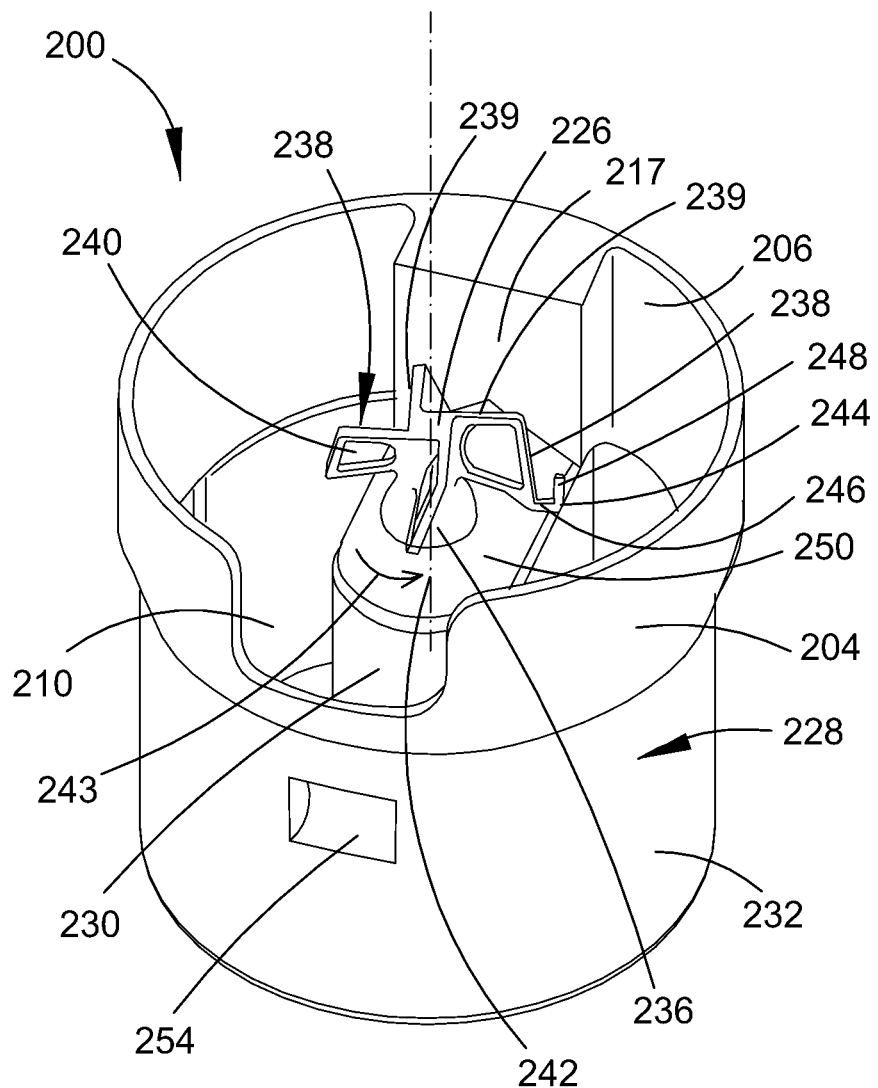
FIG. 20 is a further schematic isometric view of the coffee puck removal device of FIG. 18.
Figure 23:
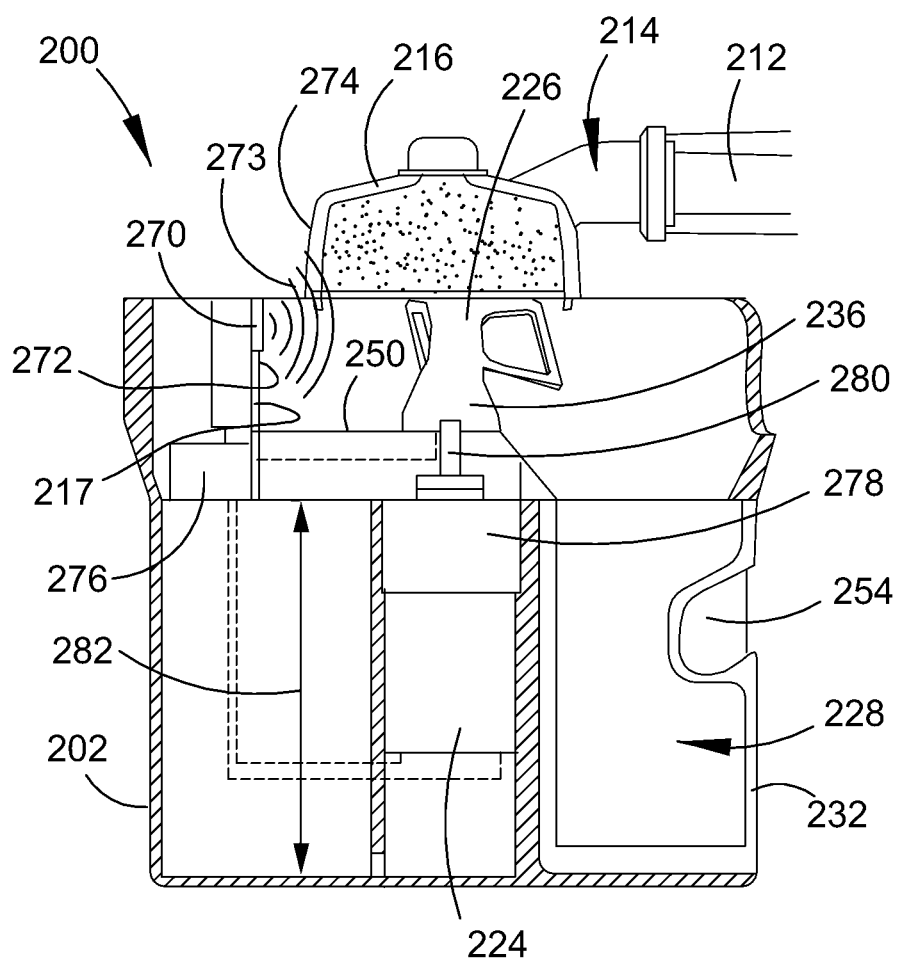
FIG. 23 is a schematic sectional side view of the coffee puck removal device of FIG. 18.

The lower compartment 202 is defined by a vertical outer wall 218 having a pair of edge portions 220. The coffee puck removal device 200 includes a motor housing 222 that is integrated with the vertical outer wall 218 of the lower compartment 202. The motor housing 222 houses an electric motor 224 (as best shown in FIG. 23), for example, a geared motor. The coffee puck removal device 200 further includes a scraper 226 (as best shown in FIG. 20) mounted to the motor housing 222. The scraper 226 is driven by the electric motor 224 and is adapted to scrape and dislodge the coffee puck from the open compartment of the portafilter 214.

Figure 19:
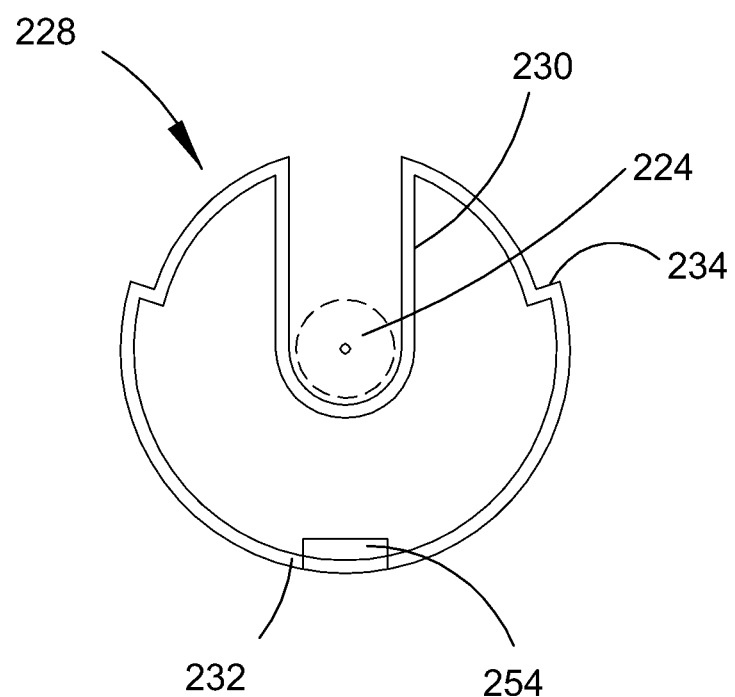
FIG. 19 is a schematic sectional top view of a waste compartment of the coffee puck removal device of FIG. 18.

The coffee puck removal device 200 further includes a waste compartment 228 adapted to receive the coffee puck dislodged from the open compartment of the portafilter 214. As best shown in FIG. 19, the waste compartment has a generally "U" shaped cross-sectional profile defined by an inner wall 230 and an outer wall 232. The outer wall 232 includes a pair of shoulder portions 234. The waste compartment 228 is adapted to removably engage the lower compartment 202 in a similar manner to a drawer, whereby the inner wall 230 of the waste compartment 228 engages the motor housing 222 and the vertical outer wall 218 of the lower compartment 202, and the edge portions 220 of the lower compartment 202 engage the shoulder portions 234 of the waste compartment 228. When the waste compartment 228 is fully engaged with the lower compartment 202, the outer wall 232 of the waste compartment 228 sits flush with the vertical outer wall 218 of the motor housing 222.

As best shown in FIG. 20, the scraper 226 includes a hub 236 operatively associated with the electric motor 224 and a set of scraper members 238 supported by the hub 236. It will be understood that the scraper 226 is adapted to be inserted through a coffee puck and rotated so as to agitate the coffee puck, thereby causing the coffee puck to be dislodged from the open compartment of the portafilter 214. In the depicted embodiment, the scraper 226 includes four scraper members 238 having an edge portion 239 adapted to scrape or wipe the inner walls or the floor of the open compartment of the portafilter 214. Each of the scraper members 238 includes an opening 240 to at least reduce the amount of force exerted on to the scraper 226 by the coffee puck. In a preferred form, each of the scraper members 238 is offset by a distance from a central axis 242 of the hub 236 to at least increase the strength of the scraper 226. The scraper 226 is adapted to be rotatably driven by the electric motor 224 about the central axis 242 in the direction 243. It is envisaged that the scraper 226 is formed from a unitary polymeric moulding.

In a preferred form, each of the scraper members 238 includes a rim wiping portion 244. The rim wiping portion 244 includes a first arm portion 246 extending radially outwardly from the central axis 242 and a second arm portion 248 extending upwardly from the first arm portion 246. The first and second arm portions 246 and 248 define a gap for receiving a rim of the portafilter compartment. The first and second arm portions 246 and 248 are adapted to wipe or scrape the walls for the portafilter compartment so as to provide additional cleaning.

The motor housing 222 includes an upper surface 250. In a preferred form, the upper surface 250 is adapted to angle downwardly away from the scraper 226 such that the coffee puck dislodged from the open compartment of the portafilter 214 falls onto the upper surface 250 and is directed into the waste compartment 228.

Figure 21:
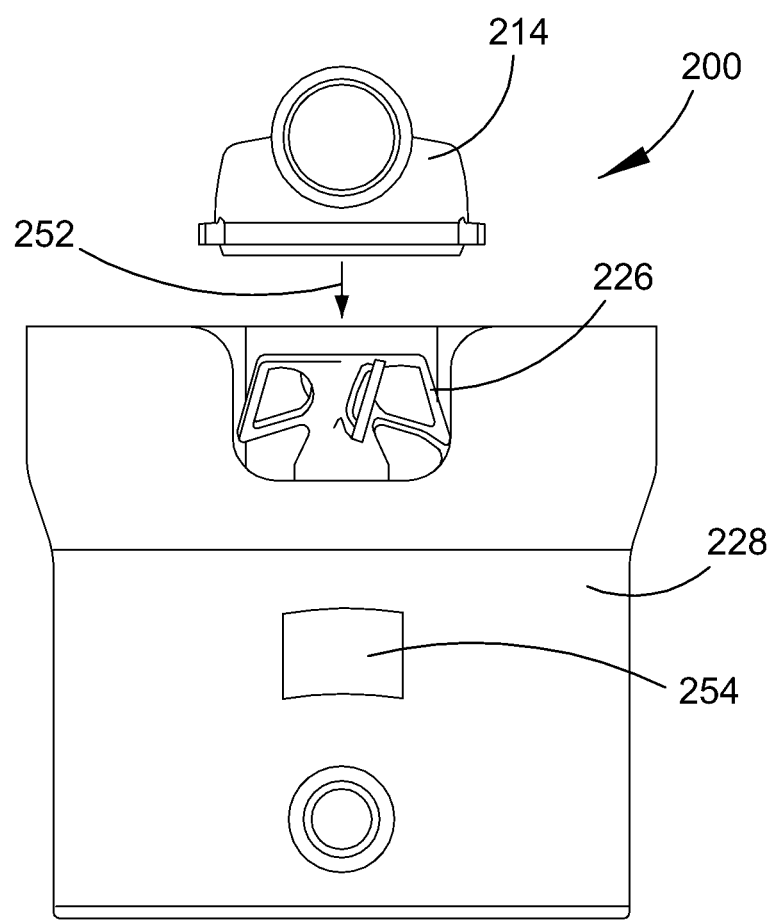
FIG. 21 is a schematic side elevation view of the coffee puck removal device of FIG. 18 and a portafilter.

FIG. 21 shows the portafilter 214 positioned over the coffee puck removal device 200. The portafilter 214 is lowered in the direction 252 to be brought into contact with the scraper 226. The waste compartment 228 includes a recessed portion 254 formed in the outer wall 232, which allows a user to easily grip and handle the waste compartment 228 (e.g. to remove the waste compartment 228 from the device 200).

Figure 22:
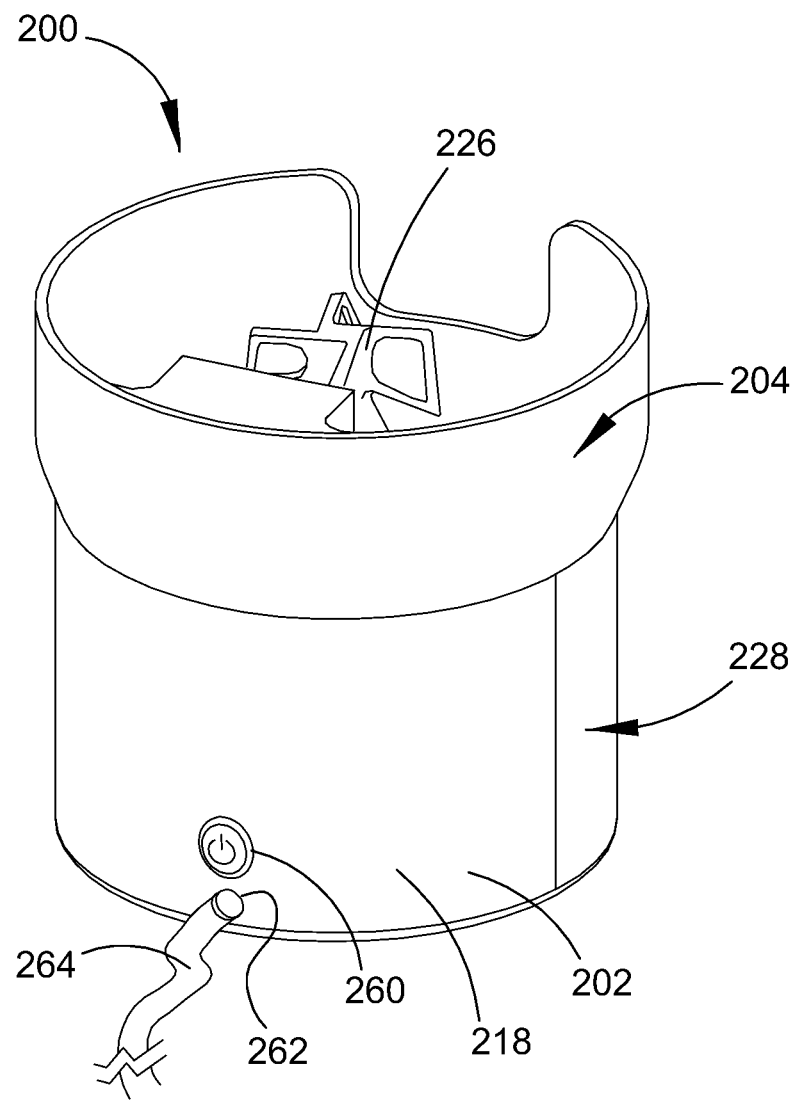
FIG. 22 is a further schematic isometric view of the coffee puck removal device of FIG. 18.

As best shown in FIG. 22, the lower compartment 202 includes a power switch 260 operatively associated with and adapted to enable operation of the motor 224. In the depicted embodiment, the power switch 260 is located on the vertical outer wall 218 of the lower compartment 202. However, it will be appreciated that in other embodiments, the power switch 260 may be located on other components of the device 200, such as the upper compartment 204 or the waste compartment 228. The vertical outer wall 218 includes an opening 262 which receives a power cord 264 of the coffee puck removal device 200.

In the embodiment as shown in FIG. 23, the coffee puck removal device 200 includes a sensor 270 mounted on an outer face 272 of the enclosure 217. It will be appreciated that in other embodiments (not shown), the sensor 270 may alternatively be mounted any location on the circumferential outer wall 206 of the upper compartment 204. The sensor 270 is adapted to detect the presence of the portafilter 214 in the upper compartment 204. It is envisaged that the sensor 270 may be in the form of a reflectance sensor, a proximity sensor, or an RFID sensor. For example, in the depicted embodiment, where the sensor 270 is in the form of a reflectance or RFID sensor, the sensor 270 is adapted to detect a signal 273 from a corresponding reflectance or RFID tag 274 located on the portafilter head 216. The reflectance or RFID tag 274 is preferably located on an opposing side of the portafilter head 216 relative to the portafilter handle 214. The sensor 270 is adapted to detect the signal 273 from the reflectance or RFID tag 274 on the portafilter head 216 and provide information to a processor 276 of the coffee puck removal device 200 regarding the presence or absence of the portafilter 214. It will be appreciated that when the sensor 270 and the processor 276 determine that the portafilter 214 is engaged in the upper compartment 204 in the correct position, the processor 276 enables the operation of the motor 224. The operation of the motor 224 then causes the rotation of the scraper 226 to scrape the coffee puck from the open compartment of the portafilter 214. It is envisaged that the rotational speed of the motor 224 may be reduced by way of a gearbox 278 and an output shaft 280 associated with the motor 224 and the scraper 226. In the depicted embodiment, the motor 224 and the gearbox 278 are contained within a vertical height 282 of the waste compartment 228.

FIG. 23 also shows the recessed portion 254 formed in the outer wall 232 of the waste compartment 228 which acts as a finger grip for the user to easily remove the waste compartment 228. It will be appreciated that the recessed portion 254 is sealed such that dislodged coffee pucks cannot escape from the waste compartment 228 through the recessed portion 254.

It is envisaged that in other embodiments (not shown), the operation of the motor 224 may be activated by a pressure switch that detects a compression of the output shaft 280.

Figure 24:
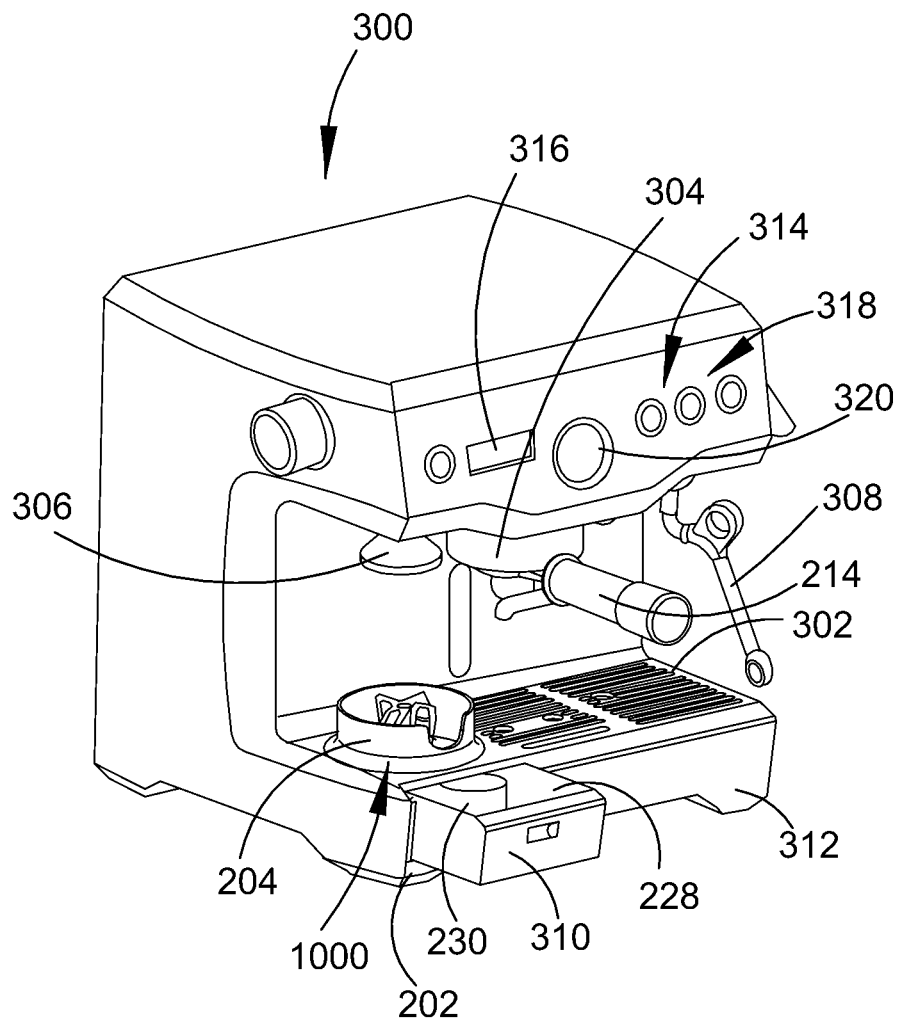
FIG. 24 is a schematic isometric view of another embodiment of a coffee puck removal device integrated into an espresso machine.

In FIG. 24, there is schematically depicted an espresso machine 300 which incorporates an embodiment of a coffee puck removal device 1000. In this embodiment, the coffee puck removal device 1000 is integrated into a platform 302 of the espresso machine 300, whereby the platform 302 of the espresso machine 300 incorporates the upper and lower compartments 204 and 202 of the coffee puck removal device 1000. The upper compartment 204 is located above the platform 302, whilst the lower compartment 202 is located below the platform 302. The platform 302 is located below a coffee outlet 304 (otherwise known as a group head), a removable tamper 306, and a steam wand 308 of the espresso machine 300. In this embodiment, the waste compartment 228 of the coffee puck removal device 1000 is adapted to removably engage the platform 302 in a similar manner to a drawer. Additionally, in this embodiment, the outer wall 232 of the waste compartment 228 has a generally flat or planar front face 310. The platform 302 also includes a generally flat or planar front face 312 such that when the waste compartment 228 is fully engaged with the platform 302, the front face 310 of the waste compartment 228 sits flush with the front face 312 of the platform 302. It will be appreciated that the inner wall 230 of the waste compartment 228 also abuts the motor housing 222 of the coffee puck removal device 1000 when the waste compartment 228 is fully engaged with the platform 302, so as to optimise the amount of available space in the waste compartment 228 to receive the coffee puck. In the depicted embodiment, the espresso machine 300 includes a user interface 314 located generally above the coffee outlet 304, the removable tamper 306, and the steam wand 308. The user interface 314 includes a graphical information display 316, user operable switches 318, and a pressure gauge 320.

Figure 25:
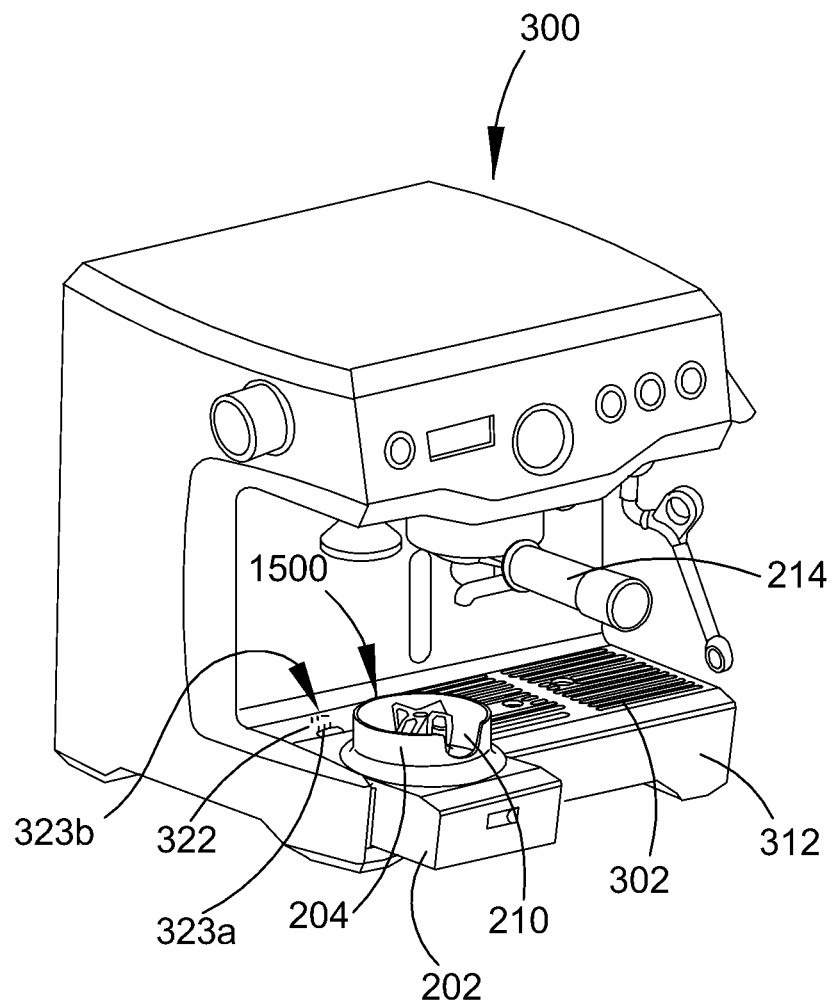
FIG. 25 is a schematic isometric view of another embodiment of a coffee puck removal device integrated into an espresso machine.

In FIG. 25, there is schematically depicted another embodiment of an espresso machine 300 which incorporates another embodiment of a coffee puck removal device 1500. The coffee puck removal device 1500 operates in generally the same manner as the devices 200 and 1000 described above, with like reference numerals being used to indicate like features. However, in this embodiment, the entire coffee puck removal device 1500, including the upper compartment 204, the lower compartment 202, and the waste compartment 228, is removable from a cavity 322 formed in the platform 302 of the espresso machine 300. It will be appreciated that the recess 210 in the circumferential upper wall 206 of the upper compartment 204 is oriented to face in the same direction as the front face 312 of the platform 302 so as to allow for ease of access to the portafilter 214. The coffee puck remove device 1500 is provided with power through plugs or contacts 323a formed in the lower compartment 202, which are adapted to engage corresponding plugs or contacts 323b formed in a surface of the espresso machine 300.

Figure 26:
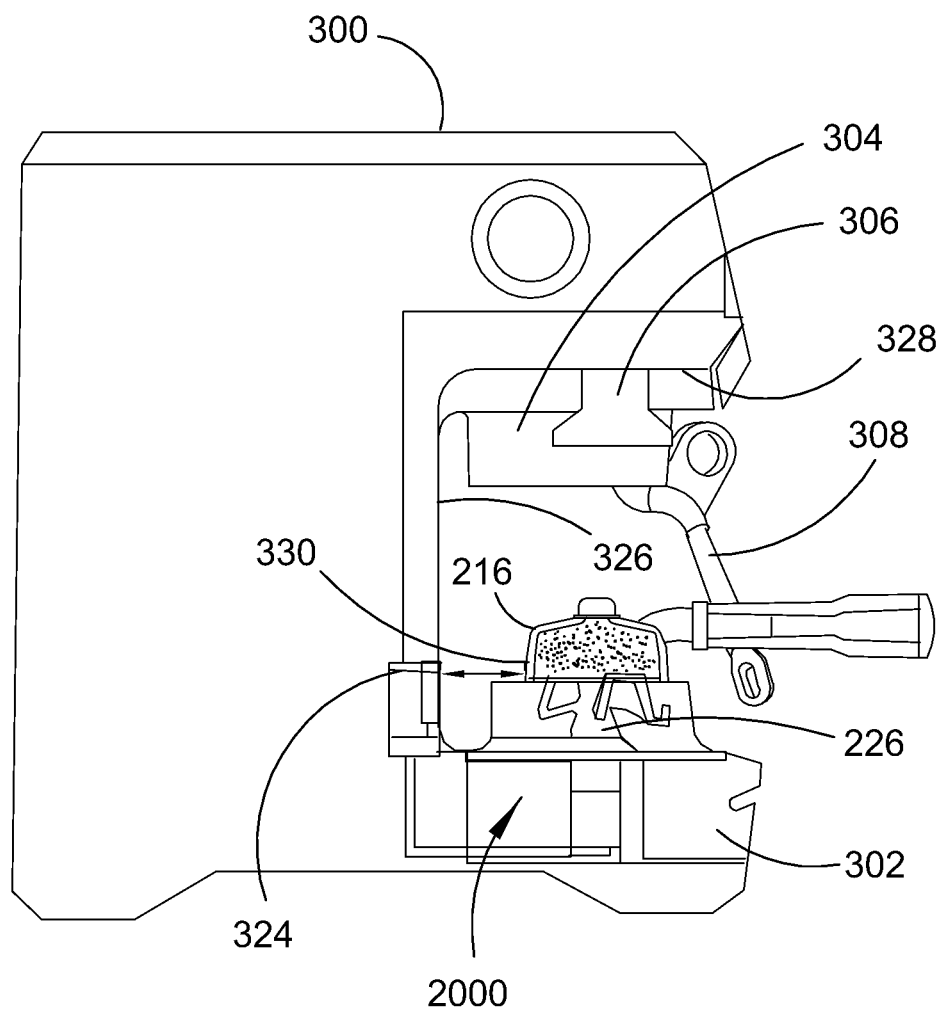
FIG. 26 is a schematic side elevation view of another embodiment of the coffee puck removal device integrated into an espresso machine.

In FIG. 26, there is schematically depicted another embodiment of an espresso machine 300 which incorporates another embodiment of a coffee puck removal device 2000. The coffee puck removal device 2000 operates in generally the same manner as the devices 200, 1000 and 1500 described above, with like reference numerals being used to indicate like features. In this embodiment, the espresso machine 300 includes a sensor 324, which operates in a similar manner to the sensor 270 described above. The sensor 324 is mounted on a wall 326 of the espresso machine 300. The wall 326 forms a vertical surface between the platform 302 and an overhanging ledge 328 of the espresso machine 300 that supports the coffee outlet 304, the removable tamper 306, and the steam wand 308. As discussed above with reference to the sensor 270, the sensor 324 may be in the form of a reflectance sensor, a proximity sensor, or an RFID sensor that is adapted to detect a signal from a corresponding reflectance or RFID tag 330 located on the portafilter head 216.

Figure 27:
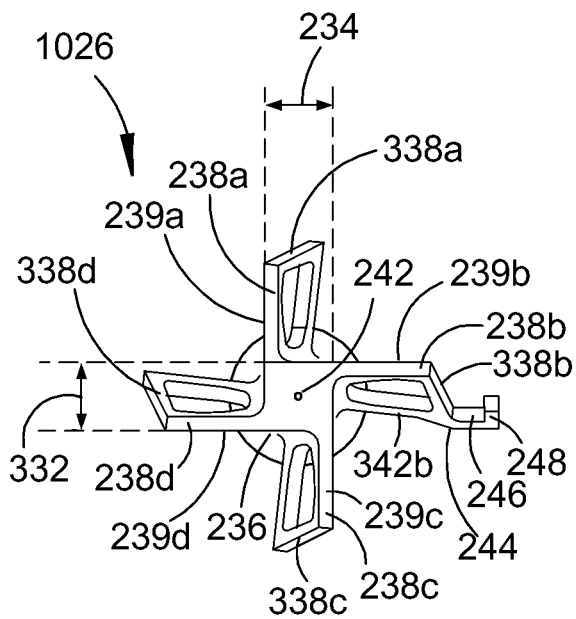
FIG. 27 is a schematic top plan view of an embodiment of a scraper of the coffee puck removal device of FIG. 18.
Figure 28:
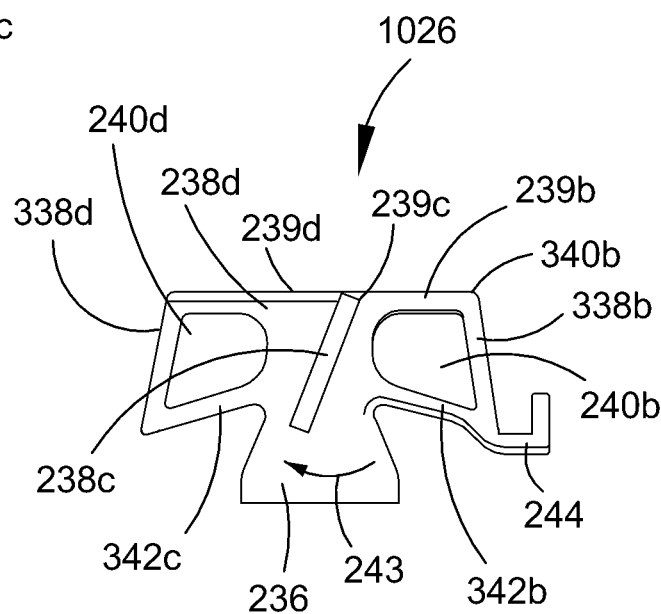
FIG. 28 is a schematic side elevation of the scraper of FIG. 27.

In FIGS. 27 and 28, there is schematically depicted an embodiment of a scraper 1026 having four scraper members 238a, 238b, 238c and 238d. The scraper 1026 operates in generally the same manner as the scraper 1026 described above, with like reference numerals being used to indicate like features. The scraper members 238a and 238c are parallel to one another and located on opposite sides of the hub 236. The first edge portions 239a and 239c of the respective scraper members 238a and 238c are offset from one another by a distance 332. The scraper members 238b and 238d are also opposing, parallel to one another and perpendicular to the orientation of the scraper members 238a and 238c. The first edge portions 239b and 239d of the respective scraper members 238b and 238d are offset from one another by a distance 334. As best shown in FIG. 28, each of the scraper members 238a, 238b, 238c and 238d is angled away from the direction of rotation 243 of the hub 236.

The first edge portions 239a, 239b, 239c, and 239d of the respective scraper members 238a, 238b, 238c, and 238d are adapted to scrape or wipe the floor of the open compartment of the portafilter 214. The scraper members 238a, 238b, 238c, and 238d also include respective second edge portions 338a, 338b, 338c, and 338d adapted to scrape the inner walls of the open compartment of the portafilter 214. The second edge portions 338a, 338b, 338c, and 338d extend from the respective first edge portions 239a, 239b, 239c, and 239d in a generally perpendicular direction, forming respective curved portions 340a, 340b, 340c, and 340d which conform to the curvature of the open compartment of the portafilter 214. The scraper members 238a, 238b, 238c, and 238d each include respective leg portion 342a, 342b, 342c, and 342d providing a connection between the hub 336 and the respective second edge portions 338a, 338b, 338c, and 338d. In the depicted embodiment, the scraper member 238b includes the rim wiping portion 144 described above. As described above, each of the scraper members 238a, 238b, 238c, and 238d includes the respective openings 240a, 240b, 240c, and 240d to at least reduce the amount of force exerted on to the scraper 1026 by the coffee puck.

Figure 29:
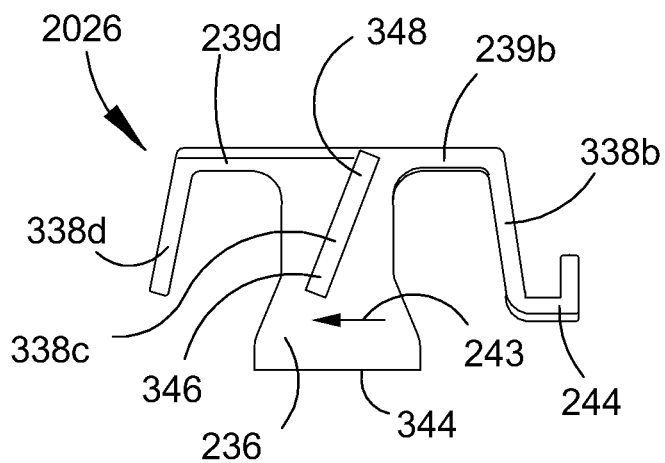
FIG. 29 is a schematic side elevation of another embodiment of a scraper of the coffee puck removal device of FIG. 18.

In FIG. 29, there is schematically depicted another embodiment of a scraper 2026 which operates in generally the same manner as the scrapers 226 and 1026 described above, with like reference numerals being used to indicate like features. However, unlike the scrapers 226 and 1026, this embodiment of the scraper 2026 does not include the leg portions 342a, 342b, 342c, and 342d described above. Accordingly, it will be appreciated that in this embodiment, the first edge portions 239a, 239b, 239c, and 239d are more flexible and capable of driving the second edge portions 338a, 338b, 338c, and 338d into more forceful engagement with the sidewalls of the portafilter 214. In this embodiment, the hub 236 extends unobstructed from a lower rim 344 of the hub 236 to the first edge portions 239a, 239b, 239c, and 239d. Each of the second edge portions 338a, 338b, 338c, and 338d also includes a lower portion 346 and an upper portion 348, and in the depicted embodiment, the lower portion 346 leads the upper portion 348. Each of the second edge portions 338a, 338b, 338c, and 338d are angled away from the direction of rotation 243 of the hub 236.

Figure 30:
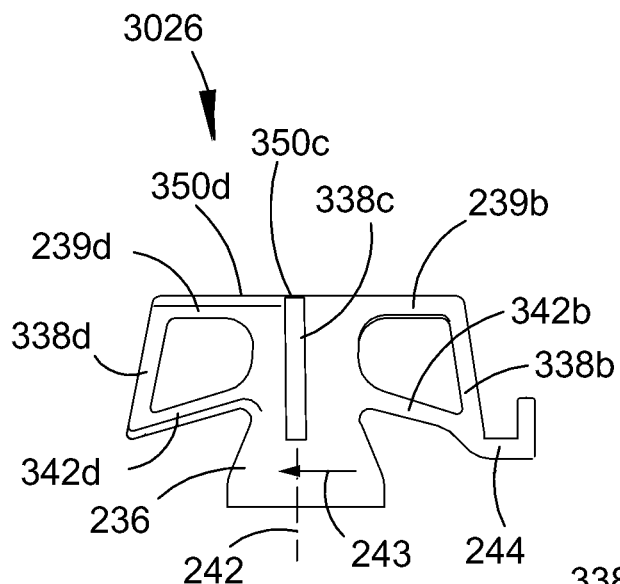
FIG. 30 is a further schematic side elevation of the scraper of FIG. 27.

In the embodiment of a scraper 3026 as schematically depicted in FIG. 30, each of the second edge portions 338a, 338b, 338c, and 338d are aligned with the central axis 242 of the hub 236. Each of the first edge portions 239a, 239b, 239c, and 239d includes respective leading edges 350a, 350b, 350c, and 350d to facilitate scraping of the floor of the open compartment of the portafilter 214.

Figure 31:
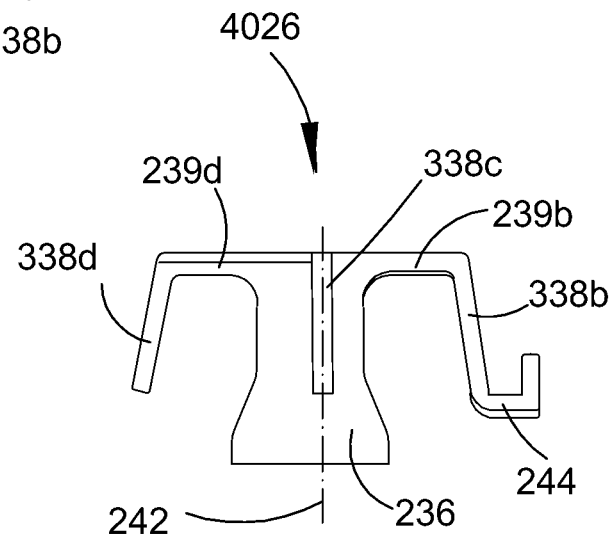
FIG. 31 is a further schematic side elevation of the scraper of FIG. 29.

In the embodiment of a scraper 4026 as schematically depicted in FIG. 31, the scraper 4026 does not include the leg portions 342a, 342b, 342c, and 342d described above.

Figure 32:
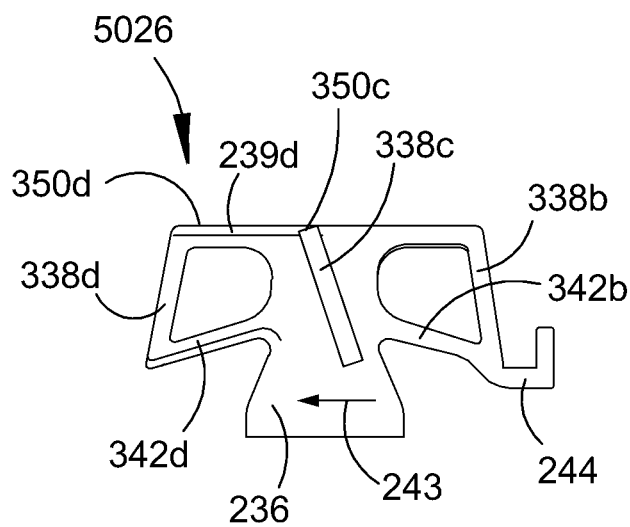
FIG. 32 is a further schematic side elevation of the scraper of FIG. 27.
Figure 33:
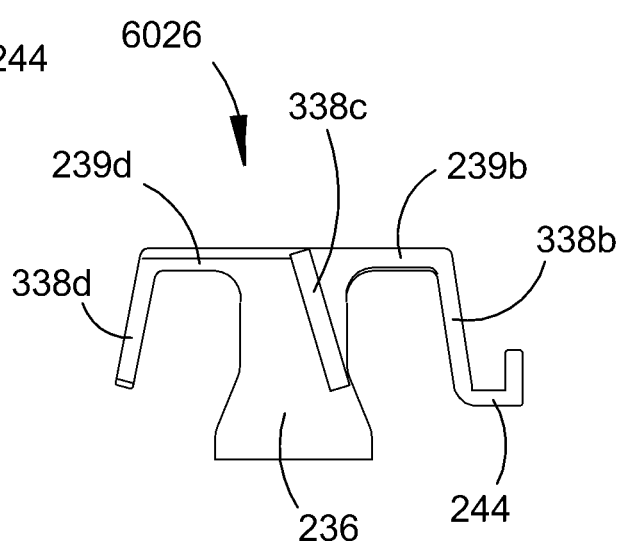
FIG. 33 is a further schematic side elevation of the scraper of FIG. 29.

In the embodiment of a scraper 5026 and 6026 as schematically depicted in FIGS. 32 and 33, each of the second edge portions 338a, 338b, 338c, and 338d are angled away from the direction of rotation 243 of the hub 236.

Figure 34:
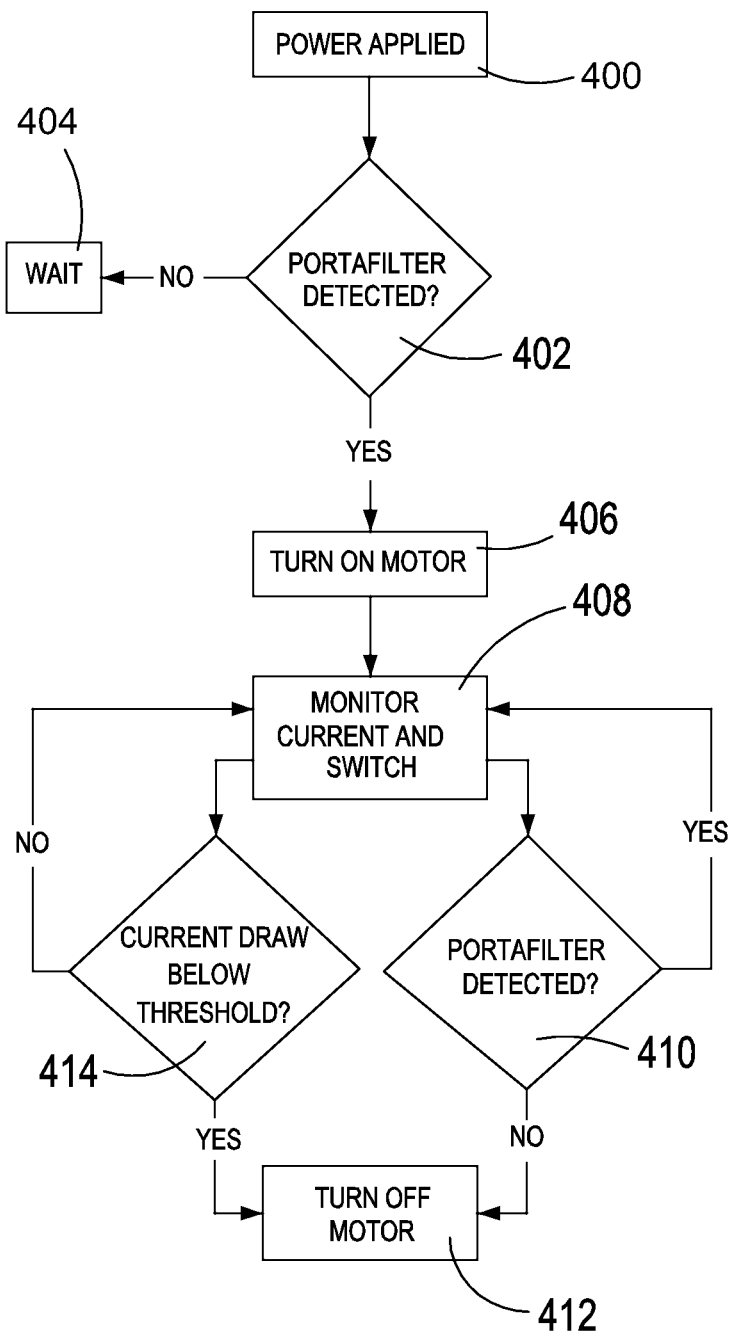
FIG. 34 is a schematic view of an operation logic of the coffee puck removal device of FIG. 18.

It will be appreciated that each of the coffee puck removal devices described above may incorporate one or more automatic shut-off modes. These modes are schematically depicted in the operation logic shown in FIG. 34 with reference to the coffee puck removal device 200, as an example. At step 400, power is applied to the coffee puck removal device 200, e.g. by a user manually actuating the power switch 260. At step 402, the sensor 270 detects the presence or absence of the portafilter 214 in the upper compartment 204 of the coffee puck removal device 200. If the portafilter 214 is absent, then the motor 224 is not operated at step 404. If the portafilter 214 is present, then operation of the motor 224 is enabled at step 406.

At step 408, a current measuring device associated with the motor 224 monitors and detects the current draw or load on the motor 224 when the motor 224 is operated. The current measuring device also provides a signal indicative of the current draw or load being measured to the processor 276. Prior to engagement of the portafilter 214 with the scraper 226, it is envisaged that the current draw or load on the motor 224 will be at a minimal "free-spinning" level.

The operation of the motor 224 may be disabled in one of two ways. At step 410, if the sensor 270 detects that the portafilter 214 is still present in the upper compartment 204 of the coffee puck removal device 200, the processor 276 sends a signal to the current measuring device to allow the current measuring device to continue monitoring the current draw or load on the motor 224. If the sensor 270 detects that the portafilter 214 (with or without the coffee puck) is removed from the upper compartment 207 of the coffee puck removal device 200, the processor 276 disables the operation of the motor 224 at step 412.

Alternatively, at step 414, if the current measuring device does not detect a decrease in the current draw or load the motor 224 (e.g. if the current draw is above a predetermined threshold), the current measuring device continues to monitor the current draw or load on the motor 224 at step 408. If the current measuring device detects a decrease in the current draw or load on the motor 224 (e.g. if the current draw or load is below a predetermined threshold), the current measuring device sends a signal to the processor 276 to indicate that the coffee puck has been removed from the portafilter 214 and disables the operation of the motor 224 at step 412.

It is envisaged that in other embodiments (not shown), instead of detecting the current draw or load on the motor 224 associated with the scraper 226, the operation logic may alternatively be applied to the detection of the current draw or load on the motor that is associated with the vacuum pump. In such embodiments, a current measuring device monitors and detects the current draw or load on the motor associated with the vacuum pump, which subsequently provides a signal to the microprocessor indicative of whether or not the coffee puck has been dislodged from the portafilter. The operation of the motor associated with the vacuum pump is disabled if the current measuring device detects a decrease in the current draw or load on this motor.

Figure 35:
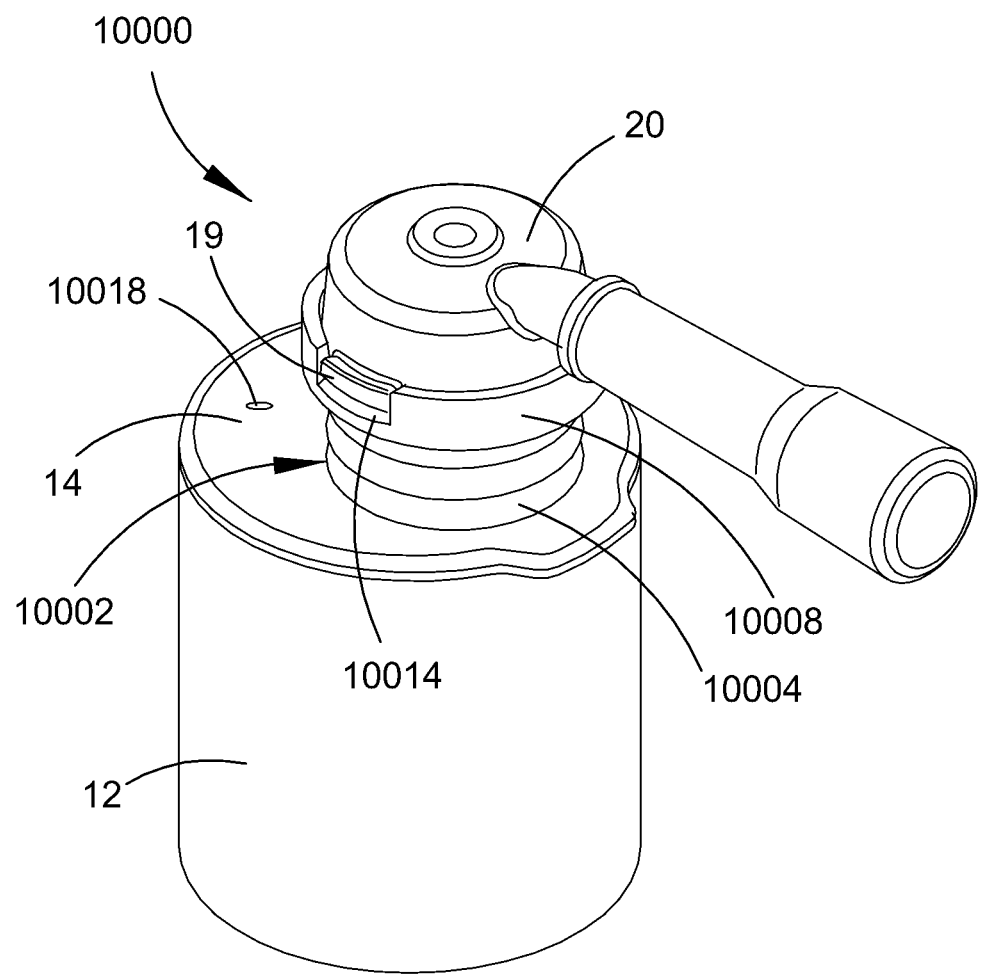
FIG. 35 is a schematic isometric view of a further embodiment of a coffee puck removal device.
Figure 36:
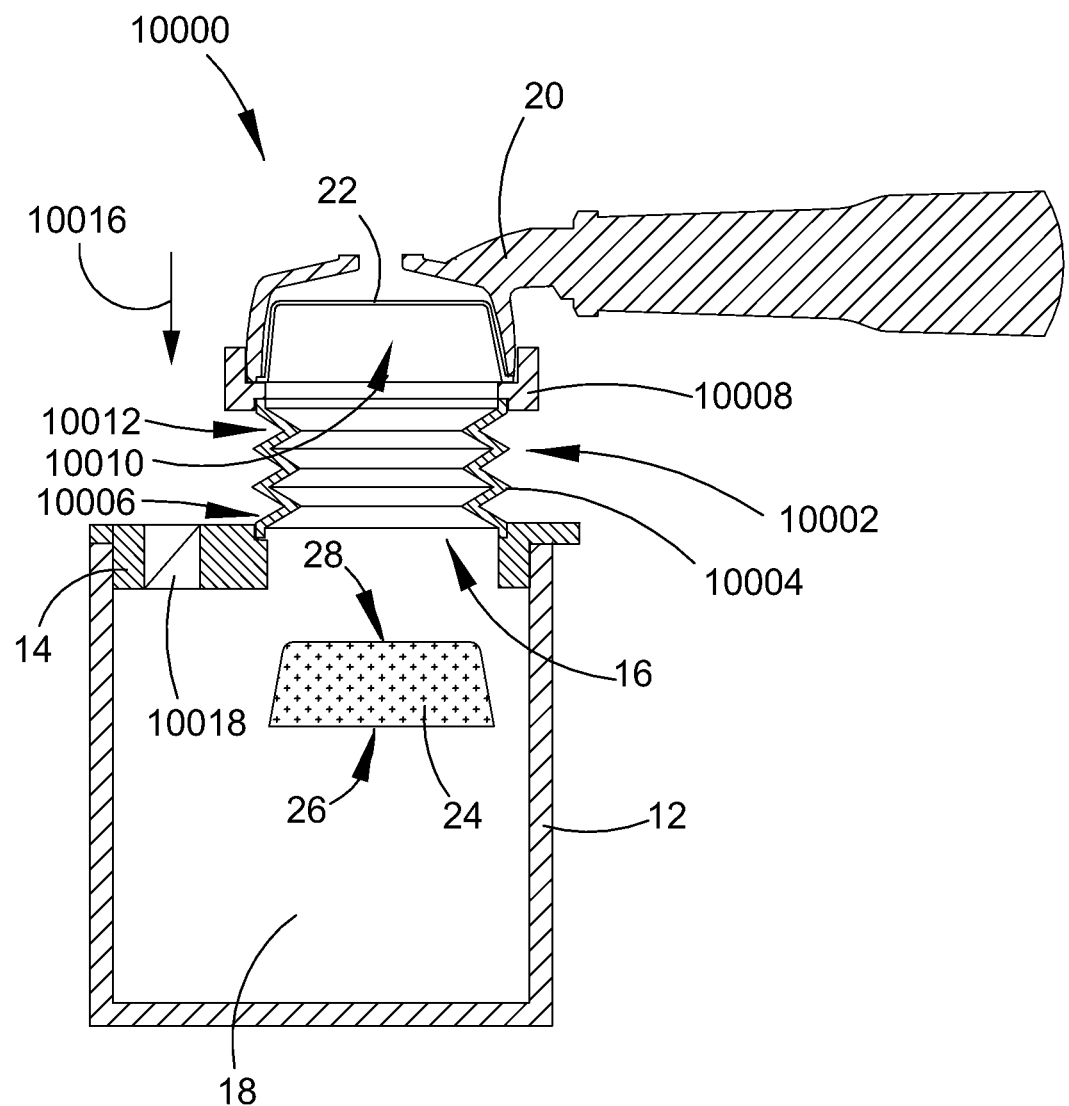
FIG. 36 is a schematic sectioned side elevation view of the coffee puck removal device of FIG. 35.

In FIGS. 35 and 36 of the accompanying drawings, there is schematically depicted a further embodiment of a coffee puck removal device 10000. The coffee puck removal device 10000 operates in generally the same manner as the device 10 described above, with like reference numerals being used to indicate like features. However, in this embodiment, the coffee puck removal device 10000 includes a mechanism 10002 (instead of the vacuum source 30) to remove air from the aperture 16 and the interior chamber 18. In the depicted embodiment, and as best shown in FIG. 36, the mechanism 10002 includes bellows 10004 extending from the rim 14 of the body 12. The bellows 10004 has a generally hollow cylindrical arrangement with accordion-like sidewalls that are resiliently deformable. A lower end portion 10006 of the bellows 10004 is sealingly engaged with the rim 14.

The mechanism 10002 further includes a rim 10008 surrounding an aperture 10010. The rim 10008 is sealingly engaged with an upper end portion 10012 of the bellows 10004. The rim 10008 is also configured to engage the portafilter 20 such that the portafilter 20 covers the aperture 10010 to inhibit air passing between the portafilter 20 and the rim 10008. The rim 10008 includes a pair of opposing slots 10014 (see FIG. 35) to engage the corresponding pair of tabs 19 on the portafilter 20 so as to correctly position the portafilter 20 in the aperture 10010.

Similar to the operation of the device 10 described above, the portafilter 20 containing the coffee puck 24 is placed on the device 10000 such that the rim 10008 engages the portafilter 20, thereby covering the aperture 10010 and inhibiting air passing between the portafilter 20 and the rim 10008. The bellows 10004 is resiliently deformable upon application of force on the rim 10008 by moving the portafilter 20 in a first direction 10016 towards the interior chamber 18. It will be understood that the first direction 10016 is generally transverse to the surface of the rim 14. The movement of the bellows 10004 causes the bellows 10004 to be compressed to create a negative pressure in the interior chamber 18. Air is removed from the interior chamber 18 through a one-way valve opening 10018 so that air pressure applied to the major inner face 28 of the coffee puck 24 is greater than air pressure applied to the exposed major outer face 26, which then causes the removal of the coffee puck 24 from the portafilter 20. As discussed above, vacuum pressure is effectively acting upon the major inner face 28 and the exposed major outer face 26 of the coffee puck 24, which results in structural compression of the coffee puck 24, with the weakest point being the exposed major outer face 26, causing the coffee puck 24 to dislodge from the portafilter 20. In the depicted embodiment, the one-way valve 10018 is located on the rim 14, although it will be understood that the one-way valve 10018 may alternatively or additionally be located on the body 12 of the device 10000.

Figure 37:
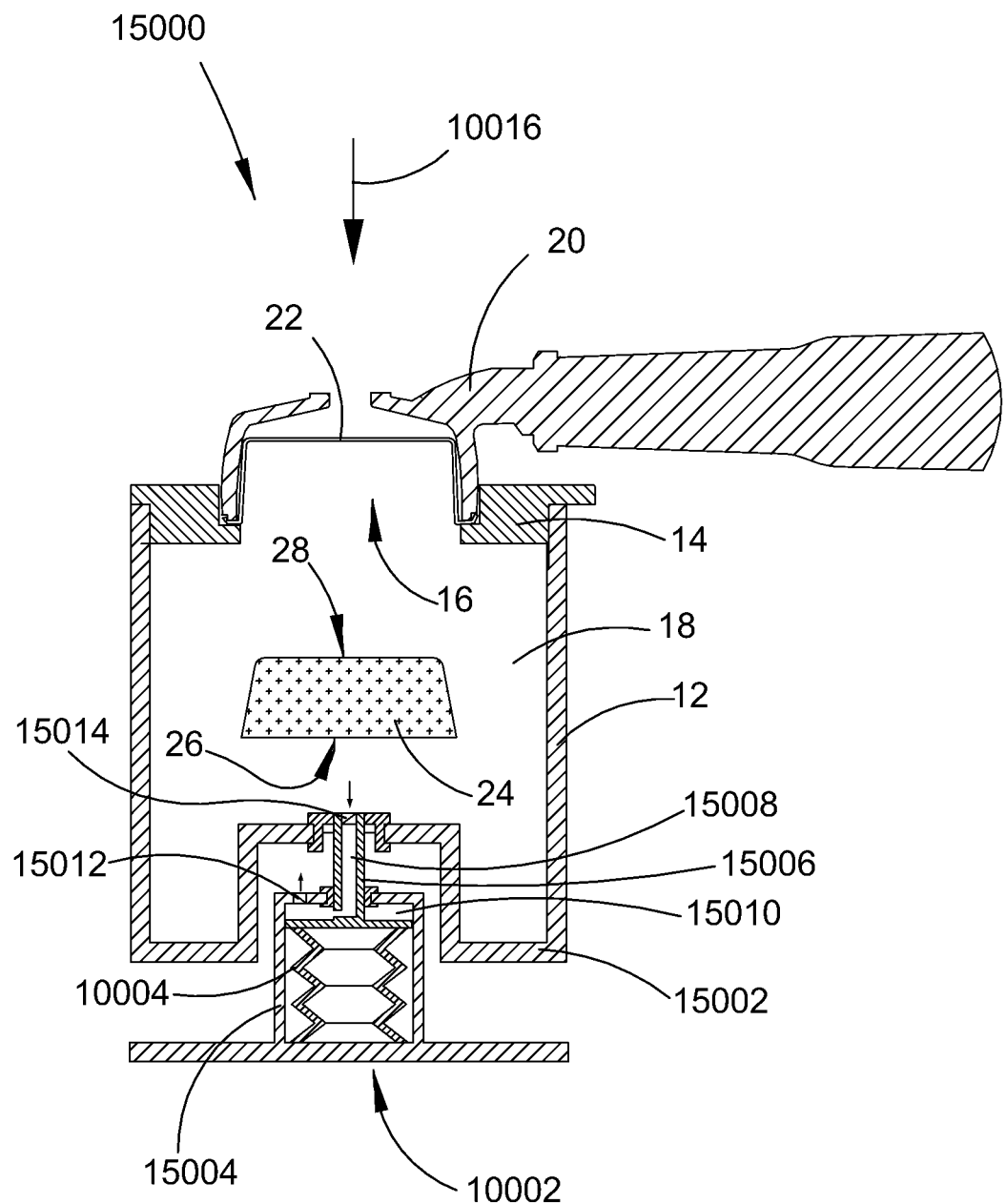
FIG. 37 is a schematic sectioned side view of a further embodiment of a coffee puck removal device.

In FIG. 37 of the accompanying drawings, there is schematically depicted a further embodiment of a coffee puck removal device 15000, which operates in generally the same manner as the device 10000 described above, with like reference numerals being used to indicate like features. However, in this embodiment, the mechanism 10002 extends from a base portion 15002 of the body 12, with the bellows 10004 being contained within a housing 15004 and connected to the base portion 15002 by way of a tube 15006. The tube 15006 includes a passage 15008 for air to travel between the interior chamber 18 of the body 12 and an interior chamber 15010 of the housing 15004. The housing 15004 includes a one-way valve opening 15012 to facilitate the escape of air from the interior chamber 15010 into the atmosphere. The tube 15006 also includes a one-way valve 15014 to facilitate the entry of air from the interior chamber 18 and into the interior chamber 15050 via the passage 15008. The housing 15004 includes a base portion 15005 to mount the device 15000 to a surface, e.g. a kitchen bench.

Similar to the operation of the devices 10 and 10000 described above, the portafilter 20 containing the coffee puck 24 is placed on the device 15000 such that the rim 14 engages the portafilter 20, thereby covering the aperture 16 and inhibiting air passing between the portafilter 20 and the rim 14. The bellows 10004 is compressed by moving the portafilter 20 in the first direction 10016 towards the interior chamber 18, thereby applying force on the rim 14, which acts to move the base portion 15002 and the tube 15006 also in the first direction 10016. Repeated compression of the bellows 10004 creates a negative pressure in the interior chamber 18. Air is removed from the interior chamber 18 via the one-way valves 15014 and 15012 so that air pressure applied to the major inner face 28 of the coffee puck 24 is greater than air pressure applied to the exposed major outer face 26, which then causes the removal of the coffee puck 24 from the portafilter 20.

Figure 38:
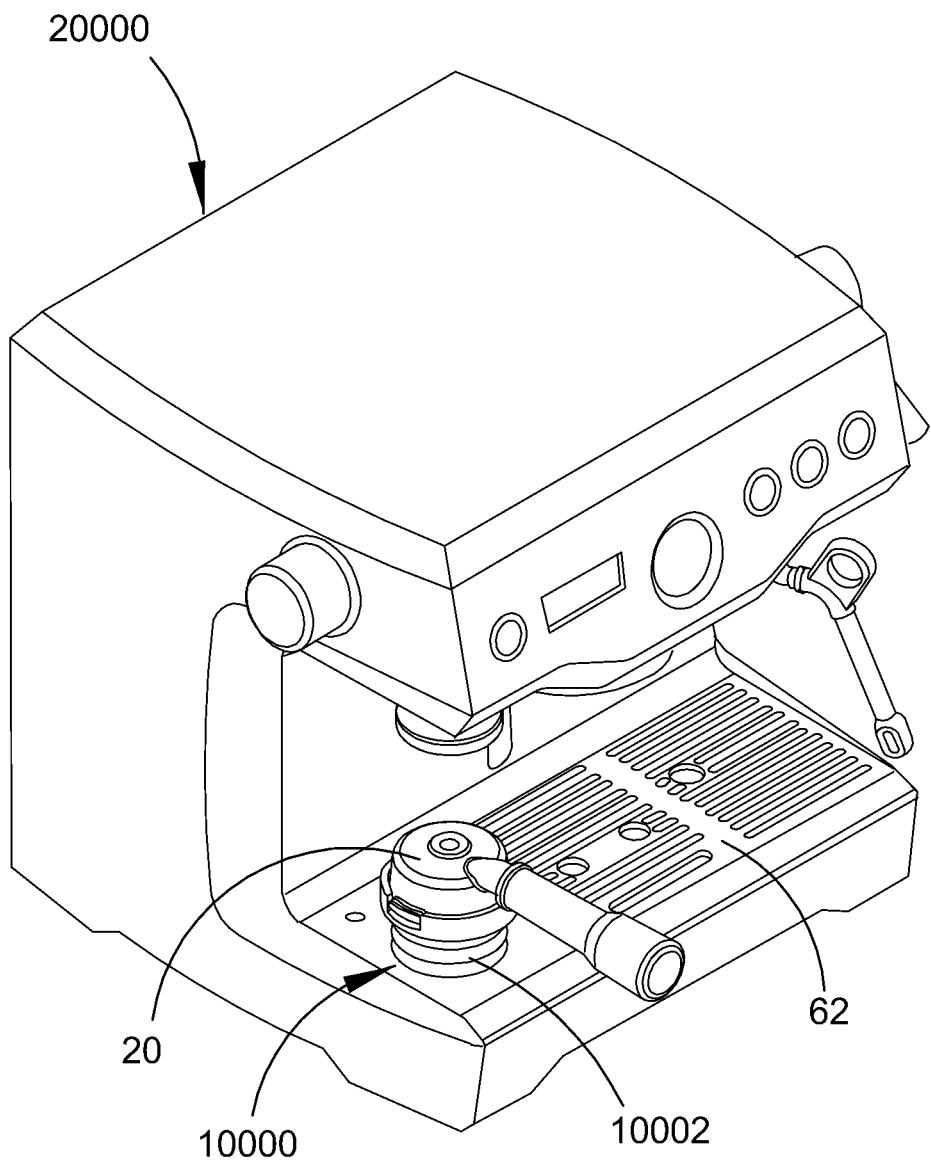
FIG. 38 is a schematic isometric view of a further embodiment of a coffee puck removal device incorporated into an espresso machine.

In FIG. 38, there is schematically depicted an espresso machine 20000 which incorporates an embodiment of the coffee puck removal device 10000 described above. The espresso machine 20000 is understood to operate in a similar manner to the espresso machine 60 described above. In this depicted embodiment, the body 12 of the coffee puck removal device 10000 is integrated into the platform 62 of the espresso machine 20000. Like the coffee puck removal device 100 described above, the coffee puck removal device 10000 is slidably engaged with the platform 62 and is removable for ease of cleaning and disposal of the captured coffee pucks.

Figure 39:
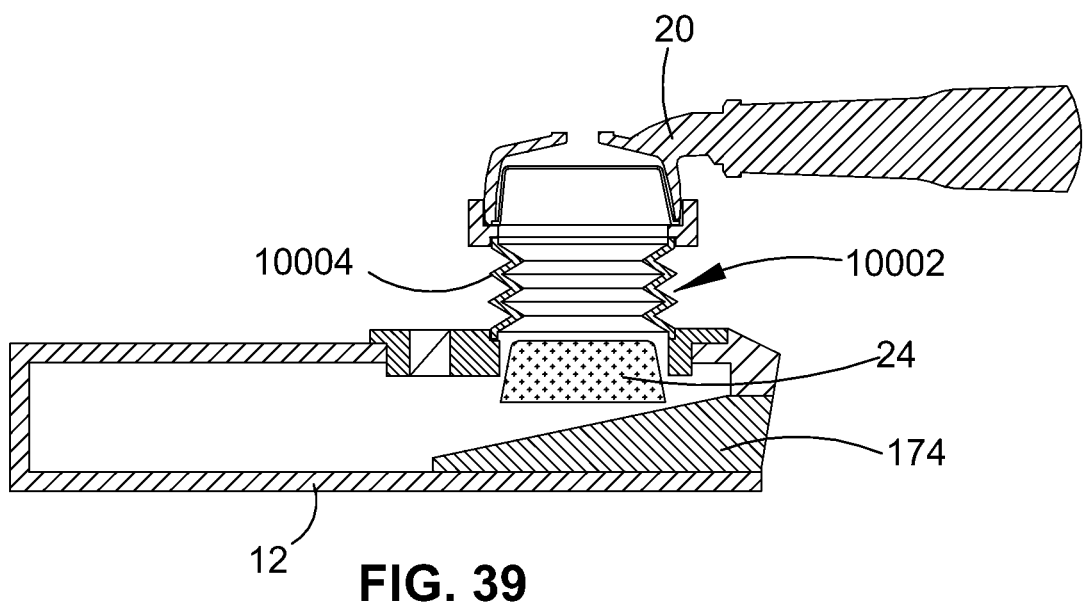
FIG. 39 is a schematic sectioned side elevation view of the coffee puck removal device of FIG. 38 isolated from the espresso machine.

In FIG. 39, there is schematically depicted the coffee puck removal device 10000 isolated from the espresso machine 20000, which operates in a similar manner to the coffee puck removal device 100 isolated from the espresso machine 60 discussed above. The rim 14 of the coffee puck removal device 10000 is likewise in the form of a removable lid. The coffee puck removal device 10000 also includes the sweeper 174 discussed above, which engages the body 12 of the device 10000, and captures the removed coffee puck 24. It will be appreciated that the coffee puck removal device 15000 described above may also be incorporated into the espresso machine 20000 and operated in a substantially similar manner.

Figure 40:
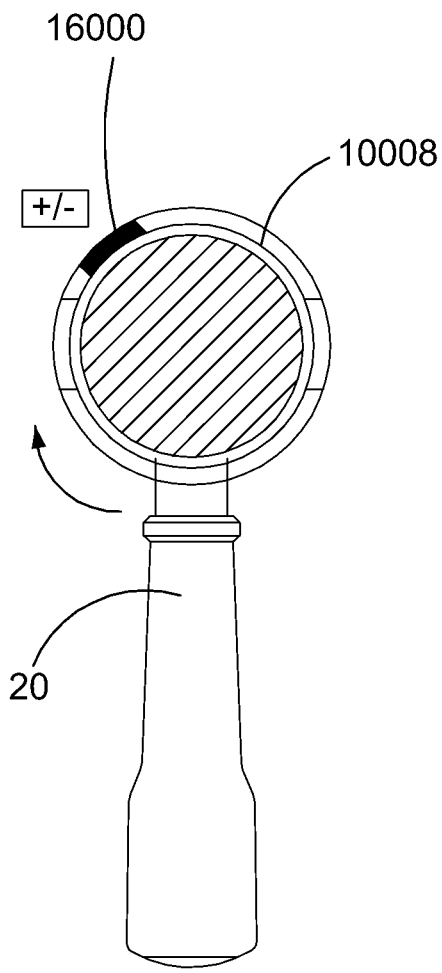
FIGS. 40 and 41 are schematic top views of a portafilter and sensor arrangement.
Figure 41:
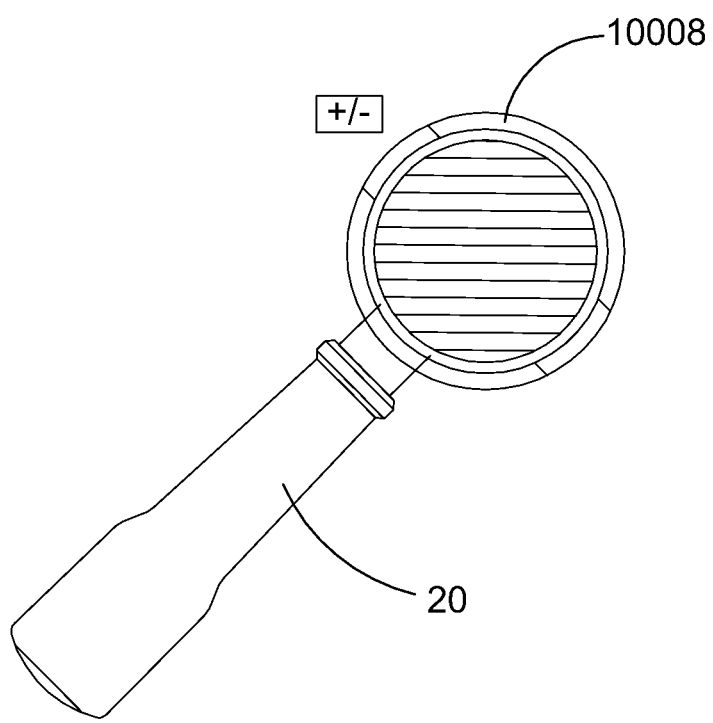

In the embodiments of the coffee puck removal devices 10000 and 15000 described above, it will be appreciated that a sensor 16000 may be incorporated into either the rim 10008 of the mechanism 10002 or the rim 14 of the body 12. The sensor 16000 is schematically depicted in FIGS. 40 and 41 to be incorporated into the rim 10008. Similar to the sensor 40 described above, the sensor 16000 detects the physical presence of the portafilter 20 in the rim 10008 and sends an associated signal to a microprocessor (not shown). The sensor 16000 may be in the form of any known sensor in the art, such as a contact/tact switch or a proximity switch.

Figure 42:
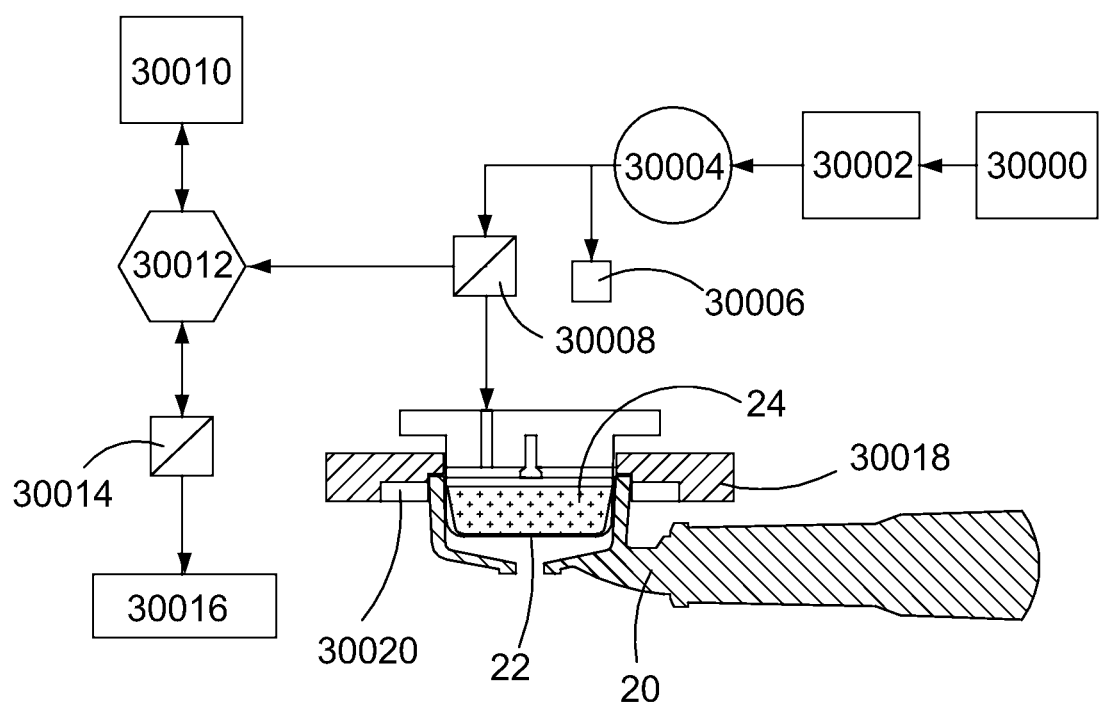
FIG. 42 is a schematic view of a further operation logic of a coffee puck removal device.

In FIG. 42, there is schematically depicted an operation logic for a first system to dislodge the coffee puck 24 from the portafilter 20, also utilizing negative pressure. It will be appreciated that this system may be incorporated into an espresso machine and the various components that are integrated into the espresso machine are utilised to create the negative pressure. Such components include a water tank 30000, a water pump 30002, a heater 30004, a flow pressure sensor 30006, a first solenoid 30008, an air pump 30010, a liquid trap 30012, a second solenoid 30014 and a drip tray 30016. A first option (i.e. option A) of implementing this operation logic is summarised in Table 1 below:

TABLE 1

Logic table for option A of first system

System 1 - Option A

|  | Water Pump | Heater | Solenoid #1 | Solenoid #2 | Air Pump | Porta-filter sensor | Pressure Sensor |
|---|---|---|---|---|---|---|---|
| Standby | OFF | OFF | OFF | OFF | OFF | Nil | Nil |
| Standby - porta-filter inserted | OFF | OFF | OFF | OFF | OFF | Detected | Nil |
| Brewing duration as per setting | ON | ON | ON | OFF | OFF | Detected | Detected |
| Stage 1 Dislodge puck up/ remove excess water 2 seconds | OFF | OFF | OFF | ON (closed) | Negative Pressure | Detected | Nil |
| Stage 2 Push water out 1 seconds | OFF | OFF | OFF | OFF | Positive Pressure | Detected | Nil |
| Stage 3 Dislodge puck down 1 seconds | OFF | OFF | OFF | ON (closed) | Positive Pressure | Detected | Nil |
| Standby - porta-filter inserted | OFF | OFF | OFF | OFF | OFF | Detected | Nil |

In option A summarised in the table above, the espresso machine is initially in a first standby mode with all components switched off. In a second standby mode, the portafilter 20 is inserted into a coffee outlet 30018 of the espresso machine. A portafilter sensor 30020 detects the presence of the portafilter 20, and the brewing mode is initiated whereby the water pump 3002, heater 30004, first solenoid 30008 are switched on. The flow pressure sensor 30006 is also detects the flow of water from the heater 30004. Upon activation, the second solenoid 30014 removes excess liquids from the portafilter compartment 22, directing the excess liquids to the liquid trap 30012, and the air pump 30010 is operated to remove the excess liquids. This creates a negative pressure in the portafilter compartment 22 (according to Stage 1 in the table above), which dislodges the coffee puck 24 from the portafilter compartment 22. In the interim, as the coffee puck 24 could be stuck on the coffee outlet 30018, the air pump 30010 is operated to introduce air into the portafilter compartment 22, thereby introducing positive pressure and disengaging the coffee puck 24 from the coffee outlet 30018 (according to Stages 2 and 3 in the table above). Upon completion of these stages, it will be understood that the coffee puck 24 simply rests in the portafilter compartment 22, and can thus be easily removed for disposal by simply turning the portafilter 20 upside down and letting the coffee puck 24 fall out.

A second option (i.e. option B) of implementing this operation logic is summarised in Table 2 below, which is somewhat similar to option A above, except that the stage of removing excess liquids and dislodging the puck from the portafilter compartment 22 occurs simultaneously.

TABLE 2

Logic table for option B of first system
System 1 - Option B

| | Water Pump | Heater | Solenoid #1 | Solenoid #2 | Air Pump | Porta-filter sensor | Pressure Sensor |
|---|---|---|---|---|---|---|---|
| Standby | OFF | OFF | OFF | OFF | OFF | Nil | Nil |
| Standby - porta-filter inserted | OFF | OFF | OFF | OFF | OFF | Detected | Nil |
| Brewing duration as per setting | ON | ON | ON | OFF | OFF | Detected | Detected |
| Stage 1 Remove excess water 1 second | OFF | OFF | OFF | OFF | OFF | Detected | Nil |
| Stage 2 Dislodge puck up 2 seconds | OFF | OFF | OFF | ON (closed) | Negative Pressure | Detected | Nil |
| Stage 2 Push water out 1 seconds | OFF | OFF | OFF | OFF | Positive Pressure | Detected | Nil |
| Stage 3 Dislodge puck down 1 seconds | OFF | OFF | OFF | ON (closed) | Positive Pressure | Detected | Nil |
| Standby - porta-filter inserted | OFF | OFF | OFF | OFF | OFF | Detected | Nil |

Figure 43:
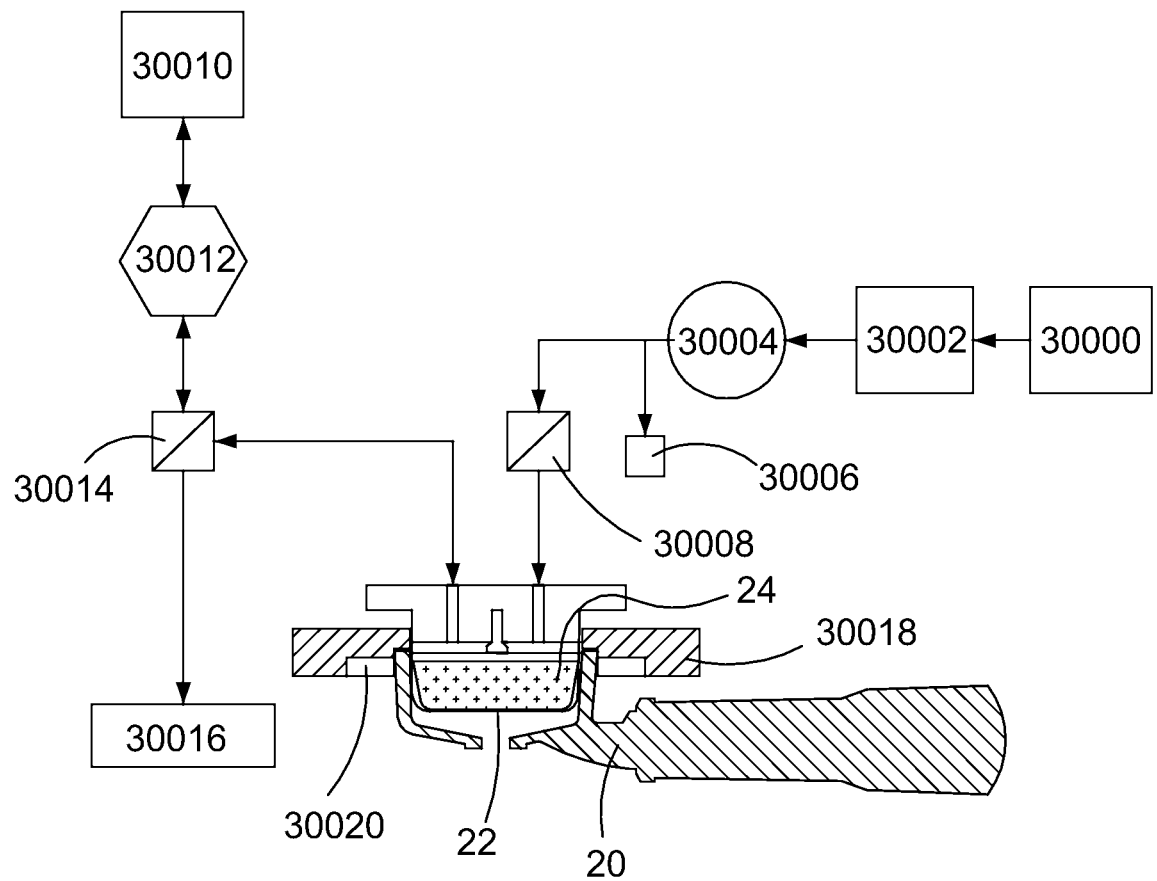
FIG. 43 is a schematic view of another further operation logic of a coffee puck removal device.

In FIG. 43, there is schematically depicted an operation logic for a second system to dislodge the coffee puck 24 from the portafilter 20. The second system operates in a generally similar manner to the first system described above. However, in this second system, a dedicated second solenoid 30014 is utilised. That is, the second solenoid 30014 and associated air pump 30010, liquid trap 30012 and drip tray 30016 are seperated from the first solenoid 30008 and associated pressure sensor 30006, heater 30004, water pump 30002 and water tank 30000. The operation logic of this second system is summarised in Table 3 below:

TABLE 3

Logic table for second system
System 2

| | Water Pump | Heater | Solenoid #1 | Solenoid #2 | Air Pump | Porta-filter sensor | Pressure Sensor |
|---|---|---|---|---|---|---|---|
| Standby | OFF | OFF | OFF | OFF | OFF | Nil | Nil |
| Standby - porta-filter inserted | OFF | OFF | OFF | OFF | OFF | Detected | Nil |
| Brewing duration as per setting | ON | ON | ON | OFF | OFF | Detected | Detected |
| Stage 1 Dislodge puck up/ remove excess water 2 seconds | OFF | OFF | OFF | ON (closed) | Negative Pressure | Detected | Nil |
| Stage 2 Push water to Drip Tray 2 seconds | OFF | OFF | OFF | OFF | Positive Pressure | Detected | Nil |
| Stage 3 Dislodge puck down 2 seconds | OFF | OFF | OFF | ON (closed) | Positive Pressure | Detected | Nil |
| Standby - porta-filter inserted | OFF | OFF | OFF | OFF | OFF | Detected | Nil |

Although the invention has been described with reference to a preferred embodiment, it will be appreciated by those persons skilled in the art that the invention may be embodied in many other forms.

The invention claimed is:

1. A method of removing a coffee puck from a portafilter having an open compartment containing the coffee puck, the method including the steps of:
   providing power to a coffee puck removal device to enable operation of a motor, wherein the motor drives a vacuum pump to dislodge the coffee puck from the open compartment of the portafilter;
   detecting pressure within an interior chamber of the coffee puck removal device by a pressure sensor; and
   disabling operation of the motor when the pressure detected by the pressure sensor reaches a predetermined threshold, indicating that the coffee puck has been dislodged.

2. The method of claim 1, including the step of removing air via an inlet located inside the coffee puck removal device and pumping the removed air into the atmosphere.

3. The method of claim 1, including the step of energizing the vacuum pump using a power source.

4. The method of claim 1, including the step of dropping the dislodged coffee puck into an interior chamber of the coffee puck removal device.

5. The method of claim 1, including the step of detecting, by a sensor, an engagement of the coffee puck removal device with the portafilter.

6. The method of claim 5, including the step of receiving, by a microprocessor, a signal from the sensor, and enabling the operation of the vacuum pump to remove air from the interior chamber of the coffee puck removal device.

7. The method of claim 5, including the step of detecting, by the sensor, the absence, removal, or disengagement of the portafilter from the coffee puck removal device.

8. The method of claim 1, including the step of detecting, by a sensor, a position of the portafilter within a close distance to the coffee puck removal device.

9. The method of claim 1, including the step of detecting, by the pressure sensor, an increase in pressure inside the coffee puck removal device after the removal of the coffee puck, and disabling, by a microprocessor, the motor based on a signal from the pressure sensor.

10. The method of claim 1, including the step of dropping, by the vacuum pump, the pressure inside the interior of the coffee puck removal device between −1 kPa to −80 kPa.

11. A method of removing a coffee puck from a portafilter having an open compartment containing the coffee puck, the method including the steps of:
   providing power to a coffee puck removal device to enable operation of a motor, wherein the motor drives a vacuum pump to dislodge the coffee puck from the open compartment of the portafilter;
   detecting a current load on the motor by a current measuring device operatively associated with the motor; and
   disabling operation of the motor when the current load on the motor detected by the current measuring device is below a predetermined threshold.

12. The method of claim 11, including the step of removing air via an inlet located inside the coffee puck removal device and pumping the removed air into the atmosphere.

13. The method of claim 11, including the step of energizing the vacuum pump using a power source.

14. The method of claim 11, including the step of dropping the coffee puck into an interior chamber of the coffee puck removal device.

15. The method of claim 11, including the step of detecting, by a sensor, an engagement of the coffee puck removal device with the portafilter.

16. The method of claim 15, including the step of receiving, by a microprocessor, a signal from the sensor, and enabling operation of a vacuum pump to remove air from an interior chamber of the coffee puck removal device.

17. The method of claim 15, including the step of detecting, by the sensor, the absence, removal, or disengagement of the portafilter from the coffee puck removal device.

18. The method of claim 11, including the step of detecting, by a sensor, a position of the portafilter within a close distance to the coffee puck removal device.

19. The method of claim 11, including the step of detecting a change in the current draw or load on the motor and disabling, by a microprocessor, the operation of the motor.

20. The method of claim 11, wherein the coffee puck removal device includes a body having a rim surrounding an aperture, and the method includes the step of engaging the portafilter with the aperture and inhibiting air passing between the portafilter and the rim.

* * * * *